(12) United States Patent
Hendry

(10) Patent No.: US 12,212,765 B2
(45) Date of Patent: Jan. 28, 2025

(54) IMAGE DECODING METHOD AND APPARATUS

(71) Applicant: LG Electronics Inc., Seoul (KR)

(72) Inventor: Hendry Hendry, Seoul (KR)

(73) Assignee: LG Electronics Inc., Seoul (KR)

( * ) Notice: Subject to any disclaimer, the term of this patent is extended or adjusted under 35 U.S.C. 154(b) by 180 days.

(21) Appl. No.: 17/915,313

(22) PCT Filed: Mar. 30, 2021

(86) PCT No.: PCT/KR2021/003891
§ 371 (c)(1),
(2) Date: Sep. 28, 2022

(87) PCT Pub. No.: WO2021/201548
PCT Pub. Date: Oct. 7, 2021

(65) Prior Publication Data
US 2023/0144371 A1    May 11, 2023

Related U.S. Application Data

(60) Provisional application No. 63/005,458, filed on Apr. 6, 2020, provisional application No. 63/002,332, filed on Mar. 30, 2020.

(51) Int. Cl.
*H04N 19/105* (2014.01)
*H04N 19/136* (2014.01)
(Continued)

(52) U.S. Cl.
CPC ......... *H04N 19/423* (2014.11); *H04N 19/172* (2014.11); *H04N 19/184* (2014.11); *H04N 19/70* (2014.11)

(58) Field of Classification Search
CPC .. H04N 19/423; H04N 19/172; H04N 19/184; H04N 19/70; H04N 19/30; H04N 19/44; H04N 19/597
See application file for complete search history.

(56) References Cited

U.S. PATENT DOCUMENTS 10,250,897 B2 *  4/2019  Deshpande ............ H04N 19/44
10,477,217 B2 * 11/2019  Narasimhan ......... H04N 19/187
(Continued)

FOREIGN PATENT DOCUMENTS

CN    106464916 B  * 10/2019  ........... H04N 19/105
CN    107079176 B  *  7/2020  ......... H04L 65/4069
(Continued)

OTHER PUBLICATIONS

ITU-T, H.265 Standard (Year: 2016).*
(Continued)

*Primary Examiner* — Philip P. Dang
(74) *Attorney, Agent, or Firm* — Fish & Richardson P.C.

(57) ABSTRACT

An image decoding method performed by a decoding apparatus according to the present disclosure comprises the steps of: obtaining image information including HRD-related information relating to a target OLS, wherein the target OLS is one of OLSs including a plurality of layers; determining whether an HRD parameter syntax structure relating to the target OLS exists, on the basis of the HRD-related information; deriving an HRD parameter syntax structure relating to the target OLS on the basis of a result of the determination; performing a DPB management process relating to a DPB on the basis of the HRD parameter syntax structure for the target OLS; and decoding a current picture on the basis of the DPB.

13 Claims, 8 Drawing Sheets

(51) Int. Cl.
*H04N 19/157* (2014.01)
*H04N 19/172* (2014.01)
*H04N 19/184* (2014.01)
*H04N 19/423* (2014.01)
*H04N 19/70* (2014.01)

(56) References Cited

U.S. PATENT DOCUMENTS 10,499,068 B2 * 12/2019 Hannuksela ......... H04N 19/136
2020/0177809 A1 * 6/2020 Hannuksela ..... H04N 21/23418

FOREIGN PATENT DOCUMENTS

EP  3158765 B1 *  3/2024  ........... H04N 19/146
KR  20170020793  2/2017
KR  20170023844  3/2017

OTHER PUBLICATIONS

Bross, Benjamin "VVC Draft 7" (Year: 2019).*
Bross, Benjamin "VVC Draft 8" (Year: 2020).*
Bross et al., "Versatile Video Coding (Draft 8)," Joint Video Experts Team (JVET) of ITU-T SG 16 WP 3 and ISO/IEC JTC 1/SC 29/WG 11, Document: JVET-Q2001-vE, 17th Meeting: Brussels, BE, Jan. 7-17, 2020, 514 pages.
Deshpande et al., "AHG9: On PTL and HRD Parameters Signalling in VPS," Joint Video Experts Team (JVET) of ITU-T SG 16 WP 3 and ISO/IEC JTC 1/SC 29/WG 11, JVET-Q0786-v2, Brussels, BE, Jan. 7-17, 2020, 4 pages.
Nishi et al., "AHG9: On signalling of PTL/HRD parameters for single layer OLSs and DPB parameters for independent layers," Joint Video Experts Team (JVET) of ITU-T SG 16 WP 3 and ISO/IEC JTC 1/SC 29/WG 11, Document: JVET-Q0046, 17th Meeting: Brussels, BE, Jan. 7-17, 2020, 3 pages.

* cited by examiner

IMAGE DECODING METHOD AND APPARATUS

CROSS-REFERENCE TO RELATED APPLICATIONS

This application is a National Stage application under 35 U.S.C. § 371 of International Application No. PCT/KR2021/003891, filed on Mar. 30, 2021, which claims the benefit of U.S. Provisional Application No. 63/005,458, filed on Apr. 6, 2020, and U.S. Provisional Application No. 63/002,332, filed on Mar. 30, 2020. The disclosures of the prior applications are hereby incorporated by reference herein in their entirety.

TECHNICAL FIELD

The present disclosure relates to an image coding technology, and more particularly, an image decoding method and apparatus for coding image information and including HRD-related syntax elements for OLS, DPB-related syntax elements, and/or PTL-related syntax elements in an image coding system.

BACKGROUND ART

Recently, demand for high-resolution, high-quality images, such as High Definition (HD) images and Ultra High Definition (UHD) images, has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high-resolution and high-quality images.

DISCLOSURE

Technical Problem

The present disclosure provides a method and apparatus for improving image coding efficiency.

The present disclosure provides a method and apparatus for signaling HRD-related syntax elements for OLS, DPB-related syntax elements, and/or PTL-related syntax elements.

Technical Solution

According to an embodiment of the present disclosure, an image decoding method performed by a decoding apparatus is provided. The method comprises obtaining image information including hypothetical reference decoder (HRD) related information for a target output layer set (OLS), wherein the target OLS is one of OLSs including a plurality of layers, determining whether an HRD parameter syntax structure for the target OLS exists based on the HRD related information, deriving the HRD parameter syntax structure for the target OLS based on the result of the determination, performing a DPB management process for a decoded picture buffer (DPB) based on the HRD parameter syntax structure for the target OLS, and decoding a current picture based on the DPB.

According to another embodiment of the present disclosure, a decoding apparatus for performing image decoding is provided. The decoding apparatus comprises an entropy decoder that obtains image information including hypothetical reference decoder (HRD) related information for a target output layer set (OLS), wherein the target OLS is one of OLSs including a plurality of layers, determines whether an HRD parameter syntax structure for the target OLS exists based on the HRD related information, and derives the HRD parameter syntax structure for the target OLS based on the result of the determination, a DPB that performs a DPB management process for a decoded picture buffer (DPB) based on the the HRD parameter syntax structure for the target OLS, and a predictor that decodes a current picture based on the DPB.

According to another embodiment of the present disclosure, a video encoding method performed by an encoding apparatus is provided. The method comprises determining whether a hypothetical reference decoder (HRD) parameter syntax structure for a target output layer set (OLS) exists, wherein the target OLS is one of OLSs including a plurality of layers, generating the HRD parameter syntax structure for the target OLS based on the result of the determination, generating HRD-related information on whether the HRD parameter syntax structure for the target OLS exists, and encoding image information including the HRD-related information.

According to another embodiment of the present disclosure, a video encoding apparatus is provided. The encoding apparatus comprises an entropy encoder that determines whether a hypothetical reference decoder (HRD) parameter syntax structure for a target output layer set (OLS) exists, wherein the target OLS is one of OLSs including a plurality of layers, generates the HRD parameter syntax structure for the target OLS based on the result of the determination, generates HRD related information on whether the HRD parameter syntax structure for the target OLS exists, and encodes image information including the HRD related information.

According to another embodiment of the present disclosure, there is provided a computer-readable digital storage medium in which a bitstream including image information causing an image decoding method to be performed is stored. In a computer-readable digital storage medium, the image decoding method comprises obtaining image information including hypothetical reference decoder (HRD) related information for a target output layer set (OLS), wherein the target OLS is one of OLSs including a plurality of layers, determining whether an HRD parameter syntax structure for the target OLS exists based on the HRD related information, deriving the HRD parameter syntax structure for the target OLS based on the result of the determination, performing a DPB management process for a decoded picture buffer (DPB) based on the HRD parameter syntax structure for the target OLS, and decoding a current picture based on the DPB.

Technical Effects

According to the present disclosure, in signaling HRD-related information for OLSs including a plurality of layers, it is possible to signal HRD-related information by determining whether to transmit HRD for each OLS, and through this, it is possible to reduce the number of bits for signaling HRD-related information for OLSs including a plurality of layers and to improve overall coding efficiency.

According to the present disclosure, the HRD index for OLS may be coded with the descriptor u(v), and through this, coding efficiency for HRD index signaling may be improved.

According to the present disclosure, HRD-related syntax elements for OLS, DPB-related syntax elements, and/or PTL-related syntax elements may be coded with descriptors u(v) or ue(v), and through this, coding efficiency for signaling of HRD-related syntax elements, DPB-related syntax elements, and/or PTL-related syntax elements may be improved.

DESCRIPTION OF DIAGRAMS

FIG. 1 briefly illustrates an example of a video/image coding system to which embodiments of the present disclosure may be applied.

Figure 4:
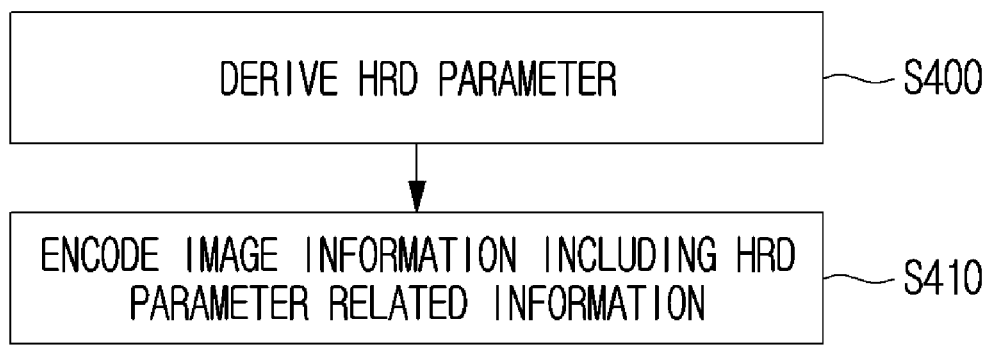

FIG. 4 exemplarily illustrates an encoding procedure according to an embodiment of the present disclosure.

Figure 5:
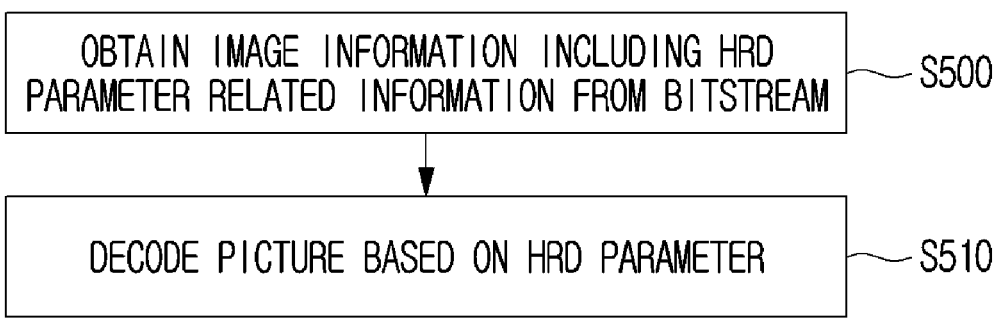

FIG. 5 exemplarily illustrates a decoding procedure according to an embodiment of the present disclosure.

Figure 6:
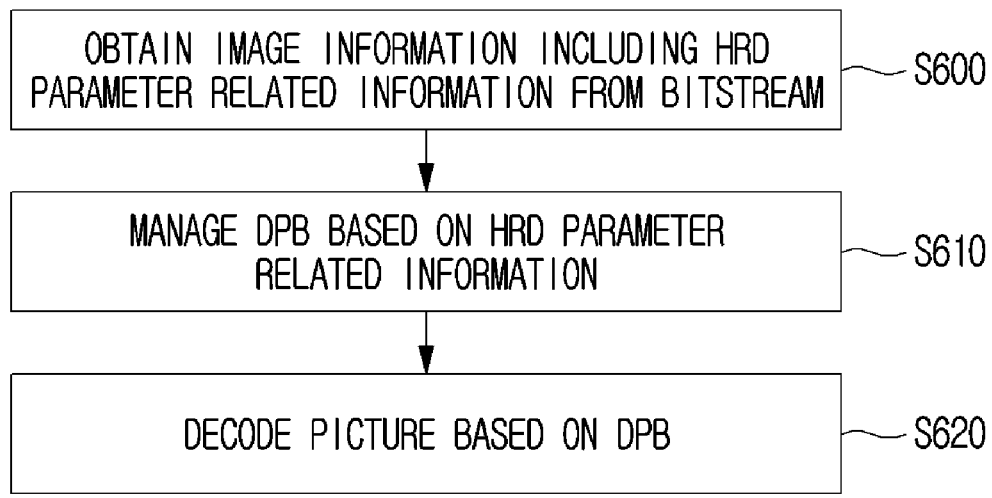

FIG. 6 exemplarily illustrates a decoding procedure according to an embodiment of the present disclosure.

Figure 7:
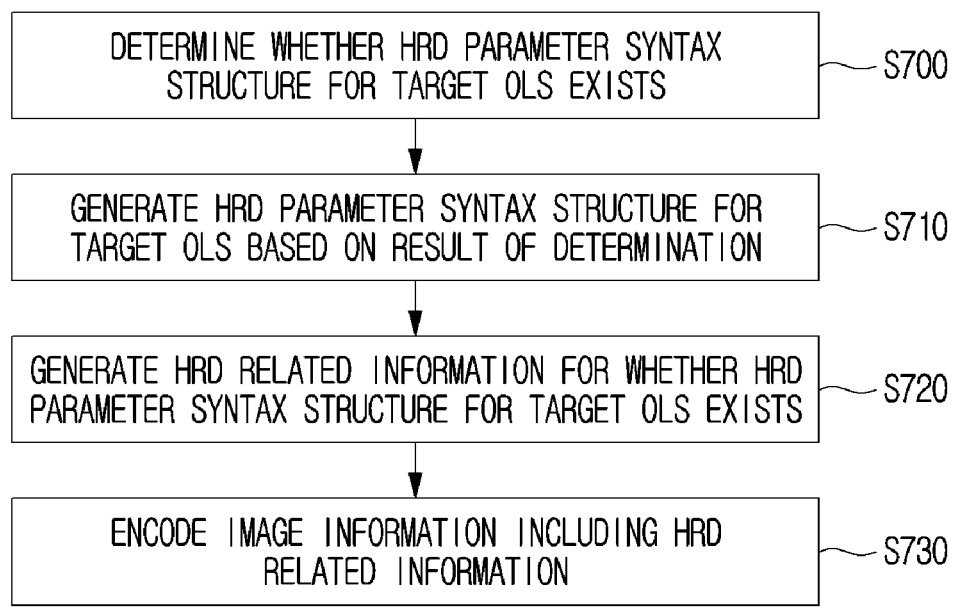

FIG. 7 briefly illustrates an image encoding method performed by an encoding apparatus according to the present disclosure.

Figure 8:
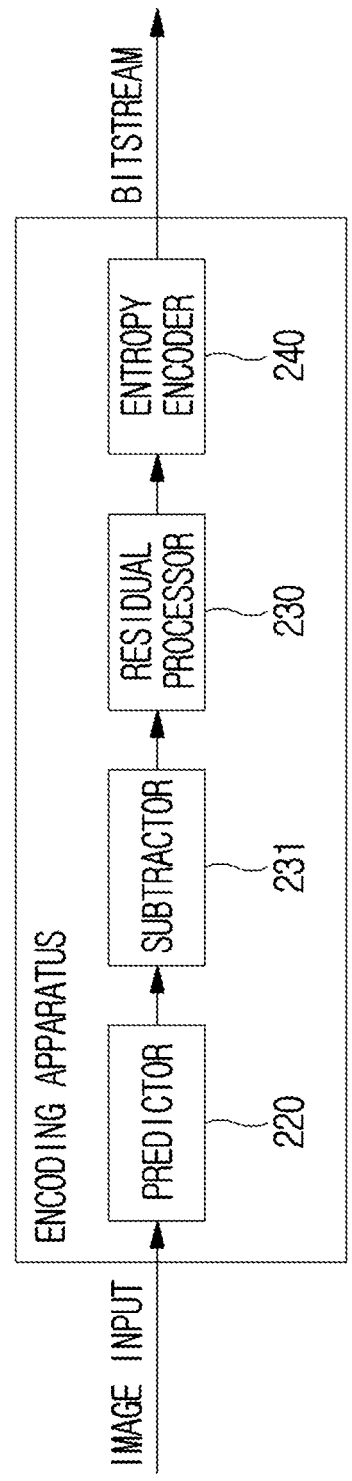

FIG. 8 briefly illustrates an encoding apparatus for performing an image encoding method according to the present disclosure.

Figure 9:
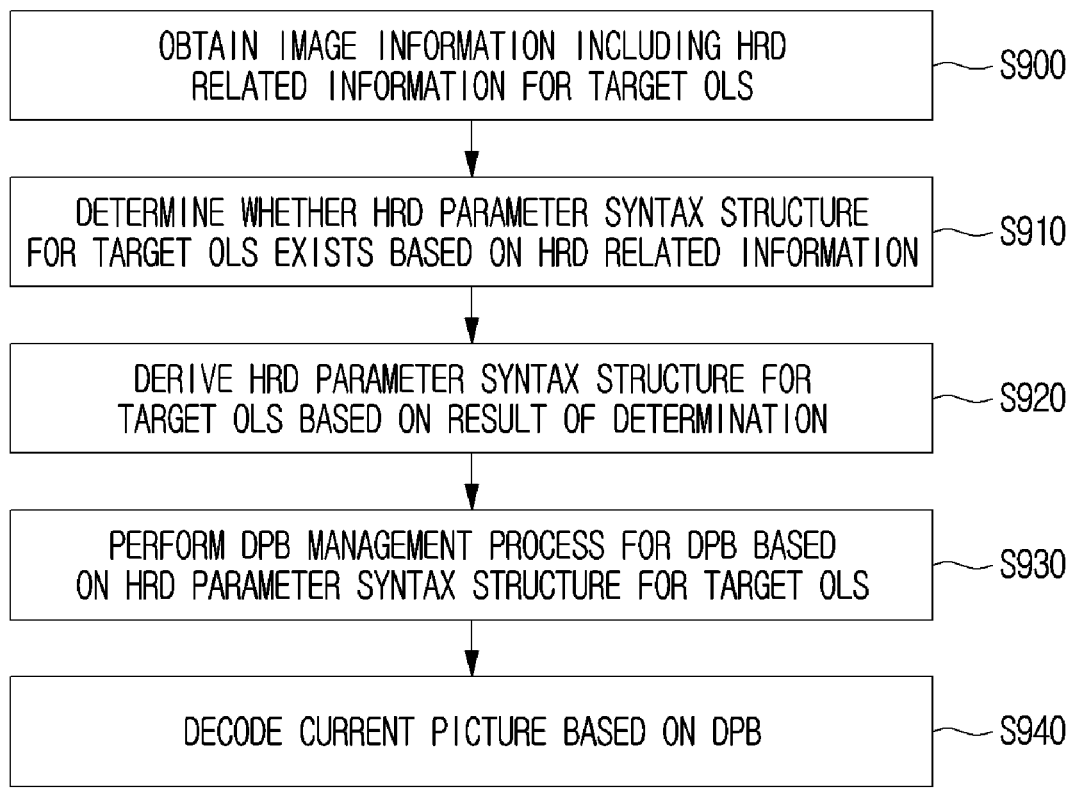

FIG. 9 briefly illustrates an image decoding method performed by a decoding apparatus according to the present disclosure.

Figure 10:
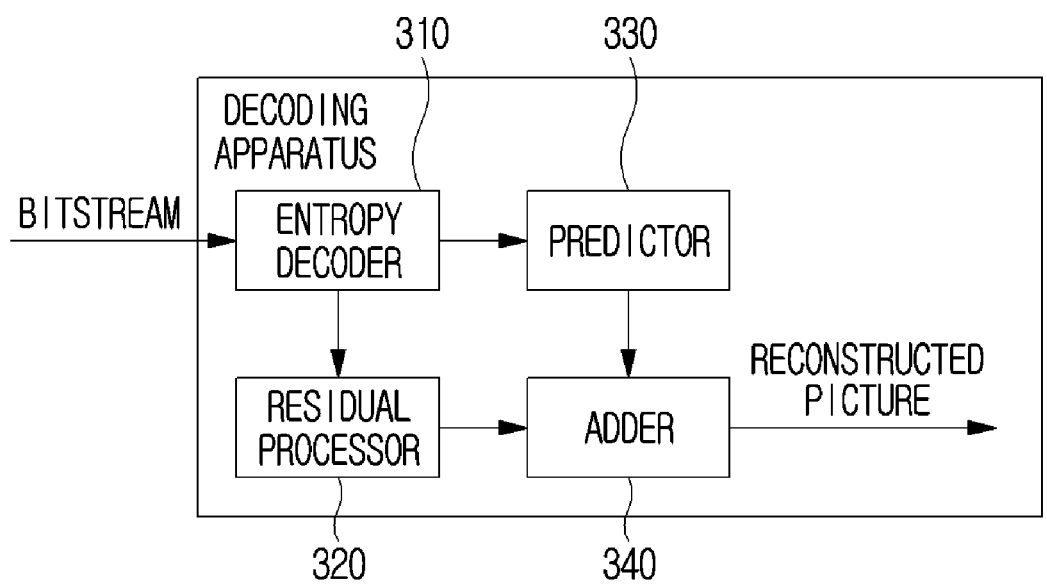

FIG. 10 briefly illustrates a decoding apparatus for performing an image decoding method according to the present disclosure.

Figure 11:
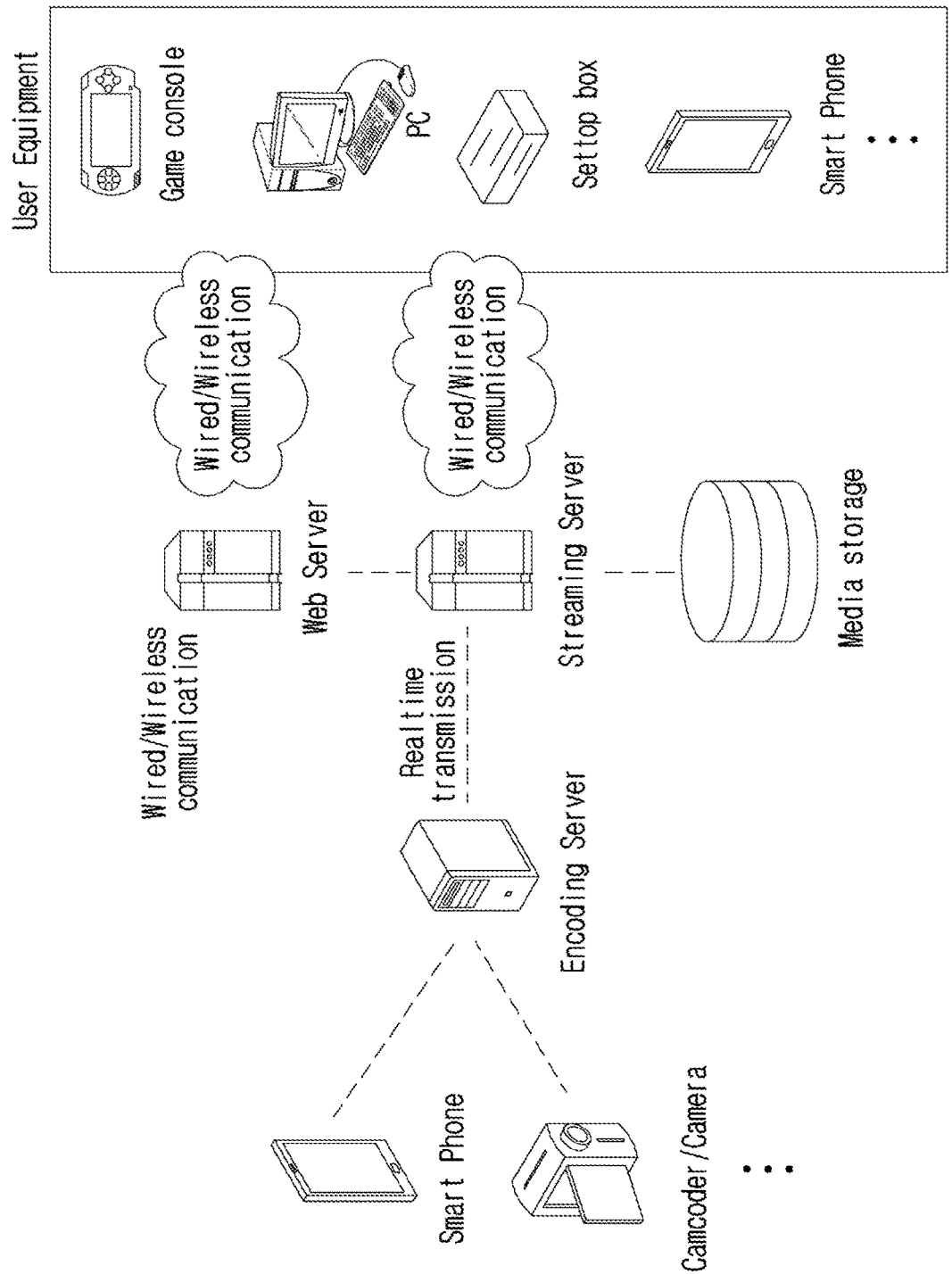

FIG. 11 illustrates a structural diagram of a contents streaming system to which the present disclosure is applied.

BEST MODE

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be partitioned into plural elements. The embodiments in which the elements are combined and/or partitioned belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

Figure 1:
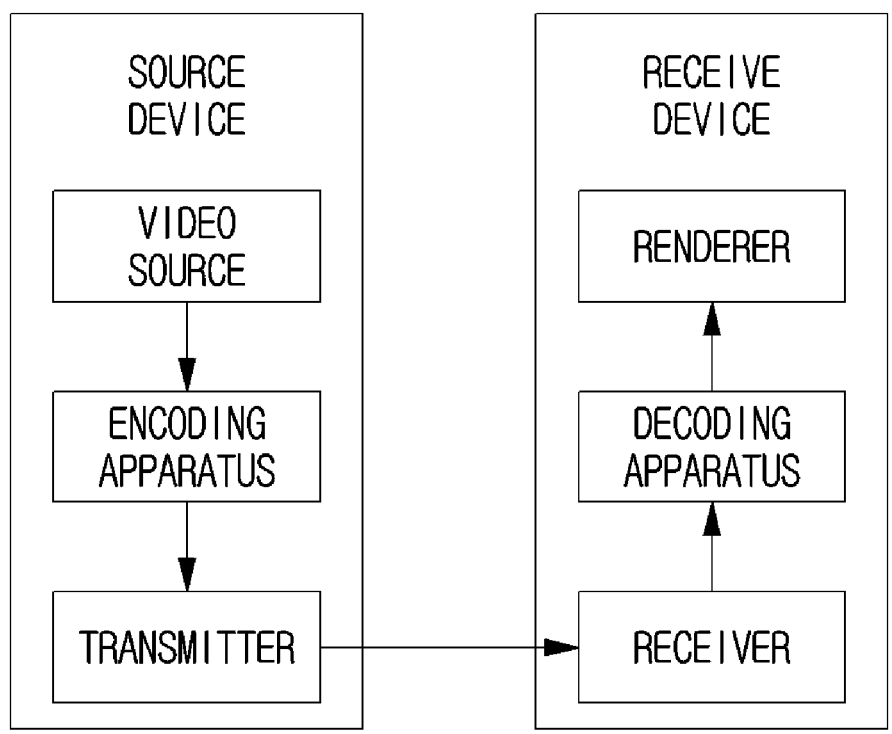

FIG. 1 briefly illustrates an example of a video/image coding device to which embodiments of the present disclosure are applicable.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input image/image. The encoding apparatus may perform a series of procedures such as prediction, transform, and quantization for compression and coding efficiency. The encoded data (encoded video/image information) may be output in the form of a bit stream.

The transmitter may transmit the encoded image/image information or data output in the form of a bit stream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bit stream and transmit the received bit stream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Present disclosure relates to video/image coding. For example, the methods/embodiments disclosed in the present disclosure may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (e.g., H.267 or H.268, etc.).

The present disclosure presents various embodiments of video/image coding, and the embodiments may be performed in combination with each other unless otherwise mentioned.

In the present disclosure, video may refer to a series of images over time. Picture generally refers to a unit representing one image in a specific time zone, and a subpicture/slice/tile is a unit constituting part of a picture in coding. The subpicture/slice/tile may include one or more coding tree units (CTUs). One picture may consist of one or more subpictures/slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. In addition, a subpicture may represent a rectangular region of one or more slices within a picture. That is, a subpicture contains one or more slices that collectively cover a rectangular region of a picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. Tile groups and slices may be used interchangeably in the present disclosure. For example, in the present disclosure, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (e.g., cb, cr) blocks. The unit may be used interchangeably with terms such as block or area in some cases. In a general case, an MXN block may include samples (or sample arrays) or a set (or array) of transform coefficients of M columns and N rows.

In the present description, "A or B" may mean "only A", "only B" or "both A and B". In other words, in the present specification, "A or B" may be interpreted as "A and/or B". For example, "A, B or C" herein means "only A", "only B", "only C", or "any and any combination of A, B and C".

A slash (/) or a comma (comma) used in the present description may mean "and/or". For example, "A/B" may mean "A and/or B". Accordingly, "A/B" may mean "only A", "only B", or "both A and B". For example, "A, B, C" may mean "A, B, or C".

In the present description, "at least one of A and B" may mean "only A", "only B", or "both A and B". In addition, in the present description, the expression "at least one of A or B" or "at least one of A and/or B" may be interpreted the same as "at least one of A and B".

In addition, in the present description, "at least one of A, B and C" means "only A", "only B", "only C", or "any combination of A, B and C". Also, "at least one of A, B or C" or "at least one of A, B and/or C" may mean "at least one of A, B and C".

In addition, parentheses used in the present description may mean "for example". Specifically, when "prediction (intra prediction)" is indicated, "intra prediction" may be proposed as an example of "prediction". In other words, "prediction" in the present description is not limited to "intra prediction", and "intra prediction" may be proposed as an example of "prediction". Also, even when "prediction (i.e., intra prediction)" is indicated, "intra prediction" may be proposed as an example of "prediction".

In the present description, technical features that are individually described within one drawing may be implemented individually or may be implemented at the same time.

The following drawings were created to explain a specific example of the present description. Since the names of specific devices described in the drawings or the names of specific signals/messages/fields are presented by way of example, the technical features of the present description are not limited to the specific names used in the following drawings.

Figure 2:
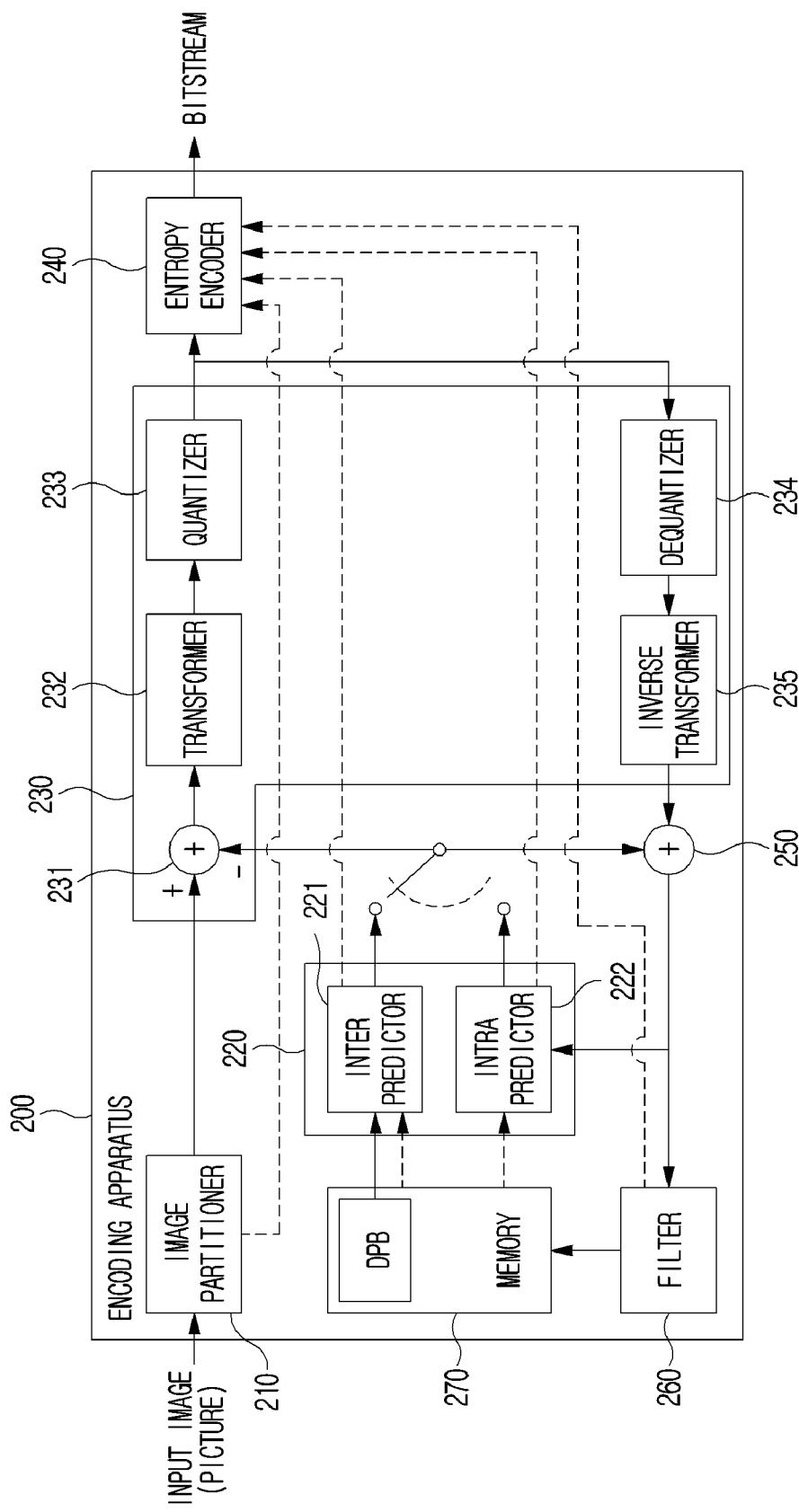
FIG. 2 is a schematic diagram illustrating a configuration of a video/image encoding apparatus to which the embodiments of the present disclosure may be applied.

FIG. 2 is a schematic diagram illustrating a configuration of a video/image encoding apparatus to which the embodiment(s) of the present disclosure may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (e.g., an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bit stream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222)

may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a Karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bit stream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g., values of syntax elements, etc.) together or separately. Encoded information (e.g., encoded video/image information) may be transmitted or stored in units of NALs (network abstraction layer) in the form of a bit stream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bit stream. The bit stream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bit stream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
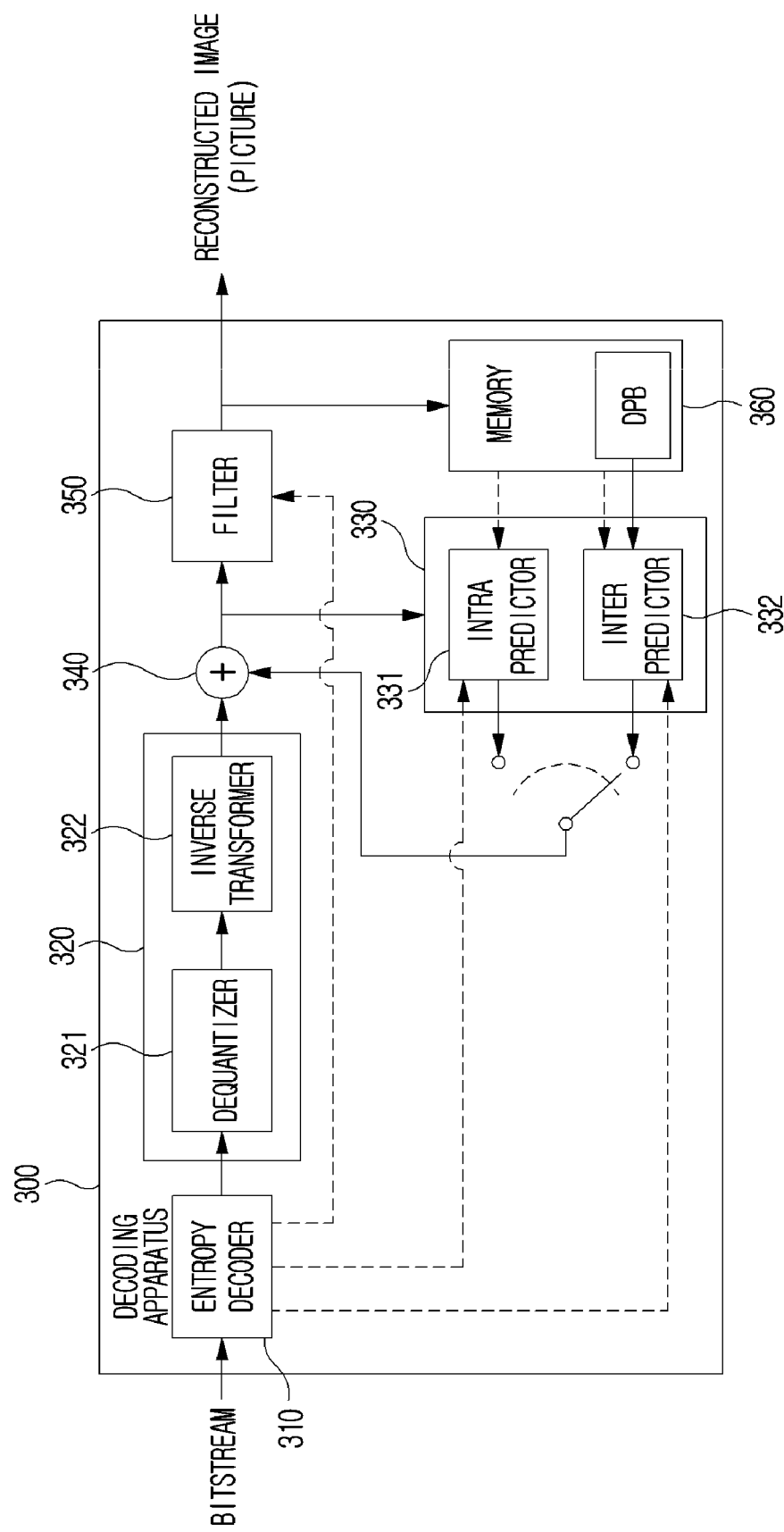
FIG. 3 is a schematic diagram illustrating a configuration of a video/image decoding apparatus to which the embodiments of the present disclosure may be applied.

FIG. 3 is a schematic diagram illustrating a configuration of a video/image decoding apparatus to which the embodiment(s) of the present disclosure may be applied.

Referring to FIG. 3, the decoding apparatus 300 may include an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350 may be configured by a hardware component (e.g., a decoder chipset or a processor) according to an embodiment. In addition, the memory 360 may include a decoded picture buffer (DPB) or may be configured by a digital storage medium. The hardware component may further include the memory 360 as an internal/external component.

When a bit stream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bit stream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bit stream, and the received signal may be decoded through the entropy decoder 310. For example, the entropy decoder 310 may parse the bit stream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bit stream. For example, the entropy decoder 310 decodes the information in the bit stream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bit stream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (e.g., quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300.

In the present disclosure, at least one of quantization/inverse quantization and/or transform/inverse transform may be omitted. When the quantization/inverse quantization is omitted, the quantized transform coefficients may be called transform coefficients. When the transform/inverse transform is omitted, the transform coefficients may be called coefficients or residual coefficients, or may still be called transform coefficients for uniformity of expression.

In the present disclosure, a quantized transform coefficient and a transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or the information on the transform coefficient(s)), and scaled transform coefficients may be derived by inverse transforming (scaling) on the transform coefficients. Residual samples may be derived based on the inverse transforming (transforming) on the scaled transform coefficients. This may be applied/expressed in other parts of the present disclosure as well.

Meanwhile, video/image information may include a video parameter set (VPS). The VPS may be a parameter set used to transmit pass includes layer information such as an Output Layer Set (OLS), a profile tier level, a relationship between OLS and a Hypothetical Reference Decoder (HRD), and a relationship between OLS and a Decoded Picture Buffer (DPB).

Also, for example, the information on the HRD may be signaled for each OLS. Here, the HRD may be a hypothetical decoder model specifying constraints on the variability of conforming NAL (network abstraction layer) unit streams or conforming byte streams that can be generated by the encoding process. When the HDR exists, the information on the HRD may be included in a VPS or a sequence parameter set (SPS) as follows.

TABLE 1

|  | Descriptor |
|---|---|
| video_parameter_set_rbsp( ) { | |
| ... | |
| ... | |
| if( !each_layer_is_an_ols_flag ) | |
|   vps_general_hrd_params_present_flag | u(1) |
| if( vps_general_hrd_params_present_flag ) { | |
|   general_hrd_parameters( ) | |
|   if( vps_max_sublayers_minus1 > 0 ) | |
|     vps_sublayer_cpb_params_present_flag | u(1) |
|   num_ols_hrd_params_minus1 | ue(v) |
|   for( i = 0; i <= num_ols_hrd_params_minus1; i++ ) | |
|   { | |
|     if( vps_max_sublayers_minus1 > 0 && !vps_all_layers_same_num_sublayers_flag ) | |
|       hrd_max_tid[ i ] | u(3) |
|     firstSubLayer = vps_sublayer_cpb_params_present_flag ? 0 : hrd_max_tid[ i ] | |
|     ols_hrd_parameters( firstSubLayer, hrd_max_tid[ i ] ) | |
|   } | |
|   if( num_ols_hrd_params_minus1 + 1 != TotalNumOlss && | |
|     num_ols_hrd_params_minus1 > 0 ) | |
|     for( i = 1; i < TotalNumOlss; i++ ) | |
|       if( NumLayersInOls[ i ] > 1 ) | |
|         ols_hrd_idx[ i ] | ue(v) |
| } | |
| ... | |
| } | |

For example, Table 1 described above may indicate a Video Parameter Set (VPS) including syntax elements for a signaled HDR parameter.

Semantics for the syntax elements shown in Table 1 above may be as follows.

TABLE 2 vps_general_hrd_params_present_flag equal to 1 specifies that the VPS contains a general_hrd_parameters( ) syntax structure and other HRD parameters.
vps_general_hrd_params_present_flag equal to 0 specifies that the VPS does not contain a general_hrd_parameters( ) syntax structure or other HRD parameters. When not present, the value of vps_general_hrd_params_present_flag is inferred to be equal to 0.
When NumLayersInOls[ i ] is equal to 1, the general_hrd_parameters( ) syntax structure and the ols_hrd_parameters( ) syntax structure that apply to the i-th OLS are present in the SPS referred to by the layer in the i-th OLS.
vps_sublayer_cpb_params_present_flag equal to 1 specifies that the i-th ols_hrd_parameters( ) syntax structure in the VPS contains HRD parameters for the sublayer representations with TemporalId in the range of 0 to hrd_max_tid[ i ], inclusive. vps_sublayer_cpb_params_present_flag equal to 0 specifies that the i-th ols_hrd_parameters( ) syntax structure in the VPS contains HRD parameters for the sublayer representation with TemporalId equal to hrd_max_tid[ i ] only. When vps_max_sublayers_minus1 is equal to 0, the value of vps_sublayer_cpb_params_present_flag is inferred to be equal to 0.
When vps_sublayer_cpb_params_present_flag is equal to 0, the HRD parameters for the sublayer representations with TemporalId in the range of 0 to hrd_max_tid[ i ] − 1, inclusive, are inferred to be the same as that for the sublayer representation with TemporalId equal to hrd_max_tid[ i ]. These include the HRD parameters starting from the fixed_pic_rate_general_flag[ i ] syntax element till the sublayer_hrd_parameters( i ) syntax structure immediately under the condition "if( general_vcl_hrd_params_present_flag )" in the ols_hrd_parameters syntax structure.
num_ols_hrd_params_minus1 plus 1 specifies the number of ols_hrd_parameters( ) syntax structures present in the VPS when vps_general_hrd_params_present_flag is equal to 1. The value of num_ols_hrd_params_minus1 shall be in the range of 0 to TotalNumOlss − 1, inclusive.
hrd_max_tid[ i ] specifies the TemporalId of the highest sublayer representation for which the HRD parameters are contained in the i-th ols_hrd_parameters( ) syntax structure. The value of hrd_max_tid[ i ] shall be in the range of 0 to vps_max_sublayers_minus1, inclusive. When vps_max_sublayers_minus1 is equal to 0, the value of hrd_max_tid[ i ] is inferred to be equal to 0. When vps_max_sublayers_minus1 is greater than 0 and vps_all_layers_same_num_sublayers_flag is equal to 1, the value of hrd_max_tid[ i ] is inferred to be equal to vps_max_sublayers_minus1.
ols_hrd_idx[ i ] specifies the index, to the list of ols_hrd_parameters( ) syntax structures in the VPS, of the ols_hrd_parameters( ) syntax structure that applies to the i-th OLS when NumLayersInOls[ i ] is greater than 1. The value of ols_hrd_idx[[ i ]] shall be in the range of 0 to num_ols_hrd_params_minus1, inclusive.
When NumLayersInOls[ i ] is equal to 1, the ols_hrd_parameters( ) syntax structure that applies to the i-th OLS is present in the SPS referred to by the layer in the i-th OLS.
If the value of num_ols_hrd_param_minus1 + 1 is equal to TotalNumOlss, the value of ols_hrd_idx[ i ] is inferred to be equal to i. Otherwise, when NumLayersInOls[ i ] is greater than 1 and num_ols_hrd_params_minus1 is equal to 0, the value of ols_hrd_idx[[ i ]] is inferred to be equal to 0.

For example, the syntax element vps_general_hrd_params_present_flag may indicate whether the VPS includes a general_hrd_parameters( ) syntax structure and other HRD parameters. For example, vps_general_hrd_params_present_flag equal to 1 may indicate that the VPS includes a general_hrd_parameters( ) syntax structure and other HRD parameters, and vps_general_hrd_params_present_flag equal to 0 indicates that the VPS does not include a general_hrd_parameters( ) syntax structure and other HRD parameters. When the syntax element vps_general_hrd_params_present_flag are not present, the value of the syntax element vps_general_hrd_params_present_flag may be inferred to be equal to 0.

When NumLayersInOls[i] is 1, the general_hrd_parameters( ) syntax structure and the ols_hrd_parameters( ) syntax structure applied to the i-th OLS may exist in the SPS referenced by the i-th OLS layer.

Also, for example, the syntax element vps_sublayer_cpb_params_present_flag may indicate is whether the i-th ols_hrd_parameters( ) syntax structure of the VPS includes HRD parameters for sublayer representations whose TemporalId ranges from 0 to hrd_max_tid[i] (inclusive). For example, vps_sublayer_cpb_params_present_flag equal to 1 may indicate that the i-th ols_hrd_parameters( ) syntax structure of the VPS includes HRD parameters for sublayer representations whose TemporalId ranges from 0 to hrd_max_tid[i] (inclusive), vps_sublayer_cpb_params_present_flag equal to 0 may indicate that the i-th ols_hrd_parameters ( ) syntax structure of VPS includes only HRD parameters for sublayer representation with TemporalId equal to hrd_max_tid[i]. When vps_max_sublayers_minus1 is 0, the value of vps_sublayer_cpb_params_present_flag may be inferred equal to 0.

When vps_sublayer_cpb_params_present flag is 0, HRD parameters for sublayer representations with TemporalId range from 0 to hrd_max_tid[i] (inclusive) may be inferred to be equal to HRD parameters for sublayer representations with TemporalId equal to hrd_max_tid[i]. Here, HRD parameters may include from the syntax element fixed_pic_rate_general_flag[i] to the sublayer_hrd_parameters(i) syntax structure right below the condition "if (general_vcl_hrd_params_present_flag)" of the ols_hrd_parameters syntax structure.

Also, for example, the syntax element num_ols_hrd_params_minus1+1 may indicate the number of ols_hrd_parameters( ) syntax structures present in the VPS when vps_general_hrd_params_present flag is 1. The value of num_ols_hrd_params_minus1 may be in the range of 0 to TotalNumOlss−1.

Also, for example, the syntax element hrd_max_tid[i] may indicate the TemporalId of the highest sublayer representations for the HRD parameter included in the i-th ols_hrd_parameters( ) syntax structure. The value of hrd_max_tid[i] may be in the range of 0 to vps_max_sublayers_minus1. When vps_max_sublayers_minus1 is 0, the value of hrd_max_tid[i] may be inferred as 0. When vps_max_sublayers_minus1 is greater than 0 and vps_all_layers_same_num_sublayers_flag is 1, the value of vps_max_sublayers_minus1 may be considered equal to hrd_max_sublayers_minus1.

Also, for example, when NumLayersInOls[i] is greater than 1, the syntax element ols_hrd_idx[i] may indicate an index of the ols_hrd_parameters( ) syntax structure applied to the i-th OLS. The index may be an index of the ols_hrd_parameters( ) syntax structure list of the VPS. That is, the syntax element ols_hrd_idx[i] may indicate an index of an ols_hrd_parameters( ) syntax structure applied to the i-th OLS among a plurality of ols_hrd_parameters( ) syntax structures of the VPS. Here, the value of ols_hrd_idx[i] may be in the range of 0 to num_ols_hrd_params_minus1.

When NumLayersInOls[i] is 1, the ols_hrd_parameters( ) syntax structure applied to the i-th OLS may exist in the SPS referenced by the layer of the i-th OLS.

When the value of num_ols_hrd_param_minus1+1 is equal to TotalNumOlss, the value of ols_hrd_idx[i] may be inferred to be equal to i. Otherwise, that is, when NumLayersInOls[i] is greater than 1 and num_ols_hrd_params_minus1 is 0, the value of ols_hrd_idx[i] may be inferred to be equal to 0.

In addition, the general_hrd_parameters( ) syntax structure may provide some sequence-level HRD parameters used for HRD operations.

In addition, it may be a requirement of bitstream conformance that the contents of the general_hrd_parameters( ) syntax structure present in all VPS or SPS of the bitstream should be the same. For example, when the general_hrd_parameters( ) syntax structure is included in the VPS, the general_hrd_parameters( ) syntax structure may be applied to all OLSs designated by the VPS. Or, for example, when the general_hrd_parameters( ) syntax structure is included in the SPS, the general_hrd_parameters( ) syntax structure may be applied to OLS including only the lowest layer among the layers referring to the SPS, and the lowest layer may be an independent layer.

For example, the SPS including the syntax elements for the above-described signaled HDR parameters may be represented as shown in the following table.

TABLE 3

|  | Descriptor |
| --- | --- |
| seq_parameter_sct_rbsp( ) { | |
| ... | |
| sps_ptl_dpb_hrd_params_present_flag | u(1) |
| ... | |
| if( sps_ptl_dpb_hrd_params_present_flag ) { | |
| sps_general_hrd_params_present_flag | u(1) |
| if( sps_general_hrd_params_present_flag ) { | |
| general_hrd_parameters( ) | |
| if( sps_max_sublayers_minus1 > 0 ) | |
| sps_sublayer_cpb_params_present_flag | u(1) |
| firstSubLayer = | |
| sps_sublayer_cpb_params_present_flag ? 0 : | |
| sps_max_sublayers_minus1 | |
| ols_hrd_parameters( firstSubLayer, | |
| sps_max_sublayers_minus1 ) | |
| } | |
| } | |
| ... | |
| } | |

Semantics for the syntax elements shown in Table 3 above may be as follows.

TABLE 4

| |
| --- |
| sps_ptl_dpb_hrd_params_present_flag equal to 1 specifies that a profile_tier_level( ) syntax structure and a dpb_parameters( ) syntax structure are present in the SPS, and a general_hrd_parameters( ) syntax structure and an ols_hrd_parameters( ) syntax structure may also be present in the SPS. sps_ptl_dpb_hrd_params_present_flag equal to 0 specifies that none of these four syntax structures is present in the SPS. The value of sps_ptl_dpb_hrd_params_present_flag shall be equal to vps_independent_layer_flag[ GeneralLayerIdx[ nuh_layer_id ] ]. |
| ... |
| sps_general_hrd_params_present_flag equal to 1 specifies that the SPS contains a general_hrd_parameters( ) syntax structure and an ols_hrd_parameters( ) syntax structure. sps_general_hrd_params_present_flag equal to 0 specifies that the SPS does not contain a general_hrd_parameters( ) syntax structure or an ols_hrd_parameters( ) syntax structure. sps_sublayer_cpb_params_present_flag equal to 1 specifies that the ols_hrd_parameters( ) syntax structure in the SPS includes HRD parameters for sublayer representations with TemporalId in the range of 0 to sps_max_sublayers_minus1, inclusive. sps_sublayer_cpb_params_present_flag equal to 0 specifies that the ols_hrd_parameters( ) syntax structure in the SPS includes HRD parameters for the sublayer representation with TemporalId equal to sps_max_sublayers_minus1 only. When sps_max_sublayers_minus1 is equal to 0, the value of sps_sublayer_cpb_params_present_flag is inferred to be equal to 0. When sps_sublayer_cpb_params_present_flag is equal to 0, the HRD parameters for the sublayer representations with TemporalId in the range of 0 to sps_max_sublayers_minus1 − 1, inclusive, are inferred to be the same as that for the sublayer representation with TemporalId equal to sps_max_sublayers_minus1. These include the HRD parameters starting from the fixed_pic_rate_general_flag[ i ] syntax element till the sublayer_hrd_parameters( i ) syntax structure immediately under the condition "if( general_vcl_hrd_params_present_flag )" in the ols_hrd_parameters syntax structure. |

For example, the syntax element sps_ptl_dpb_hrd_params_present flag having a value of 1 may indicate that the profile_tier_level( )syntax structure and the dpb_parameters( ) syntax structure may exist in the SPS, and that the general_hrd_parameters( ) syntax structure and the ols_hrd_parameters( ) syntax structure may exist in the SPS.

sps_ptl_dpb_hrd_params_present_flag having a value of 0 may indicate that the above-described four syntax structures, that is, the profile_tier_level( ) syntax structure, the dpb_parameters( ) syntax structure, the general_hrd_parameters( ) syntax structure, and the ols_hrd_parameters( ) syntax structure do not exist in the SPS. The value of sps_ptl_dpb_hrd_params_present flag may be equal to vps_independent_layer_flag[GeneralLayerIdx[nuh_layer_id]].

Also, for example, a syntax element sps_general_hrd_params_present_flag having a value of 1 may indicate that the general_hrd_parameters( ) syntax structure and the ols_hrd_parameters( ) syntax structure are included in the SPS. The syntax element sps_general_hrd_params_present_flag having a value of 0 may indicate that the general_hrd_parameters( ) syntax structure or the ols_hrd_parameters( ) syntax structure is not included in the SPS.

In addition, for example, the syntax element sps_sublayer_cpb_params_present_flag having a value of 1 may indicate that the HRD parameters for the sublayer representations with the TemporalId range of 0 to sps_max_sublayers_minus1 are included in the ols_hrd_parameters( ) syntax structure of the SPS. The syntax element sps_sublayer_cpb_params_present flag having a value of 0 may indicate that only the HRD parameters for the sublayer representations with the TemporalId range equal to sps_max_sublayers_minus1 are included in the ols_hrd_parameters( ) syntax structure of the SPS. When sps_max_sublayers_minus1 is 0, the value of sps_sublayer_cpb_params_present_flag may be inferred to be equal to 0.

When sps_sublayer_cpb_params_present_flag is 0, the HRD parameters for sublayer representations with the TemporalId range from 0 to sps_max_sublayers_minus1−1 (inclusive) may be inferred to be equal to the HRD parameters for the sublayer representations with the TemporalId equal to sps_max_sublayers_minus1. Here, HRD parameters may be included from the syntax element fixed_pic_rate_general_flag[i] to the sublayer_hrd_parameters(i) syntax structure right below the condition "if (general_vcl_hrd_params_present_flag)" of the ols_hrd_parameters syntax structure.

Also, for example, the syntax elements of the general_hrd_parameters( ) syntax structure described above may be as follows.

TABLE 5

| | Descriptor |
|---|---|
| general_hrd_parameters( ) { | |
|   num_units_in_tick | u(32) |
|   time_scale | u(32) |
|   general_nal_hrd_params_present_flag | u(1) |
|   general_vcl_hrd_params_present_flag | u(1) |
|   general_same_pic_timing_in_all_ols_flag | u(1) |
|   general_decoding_unit_hrd_params_present_flag | u(1) |
|   if( general_decoding_unit_hrd_params_present_flag ) | |
|     tick_divisor_minus2 | u(8) |
|   bit_rate_scale | u(4) |
|   cpb_size_scale | u(4) |
|   if( general_decoding_unit_hrd_params_present_flag ) | |
|     cpb_size_du_scale | u(4) |
|   hrd_cpb_cnt_minus1 | ue(v) |
| } | |
| ols_hrd_parameters( firstSubLayer, maxSubLayers ) { | |
|   for( i = firstSubLayer; i <= maxSubLayers; i++ ) { | |
|     fixed_pic_rate_general_flag[ i ] | u(1) |
|     if( !fixed_pic_rate_general_flag[ i ] ) | |
|       fixed_pic_rate_within_cvs_flag[ i ] | u(1) |
|     if( fixed_pic_rate_within_cvs_flag[ i ] ) | |
|       elemental_duration_in_tc_minus1[ i ] | ue(v) |
|     else if( hrd_cpb_cnt_minus1 = = 0 ) | |
|       low_delay_hrd_flag[ i ] | u(1) |
|     if( general_nal_hrd_params_present_flag ) | |
|       sublayer_hrd_parameters( i ) | |
|     if( general_vcl_hrd_params_present_flag ) | |
|       sublayer_hrd_parameters( i ) | |
|   } | |
| } | |
| sublayer_hrd_parameters( subLayerId ) { | |
|   for( j = 0; j <= hrd_cpb_cnt_minus1; j++ ) { | |
|     bit_rate_value_minus1[ subLayerId ][ j ] | ue(v) |
|     cpb_size_value_minus1[ subLayerId ][ j ] | ue(v) |
|     if( general_decoding_unit_hrd_params_present_flag ) | |
|     { | |
|       cpb_size_du_value_minus1[ subLayerId ][ j ] | ue(v) |
|       bit_rate_du_value_minus1[ subLayerId ][ j ] | ue(v) |
|     } | |
|     cbr_flag[ subLayerId ][ j ] | u(1) |
|   } | |
| } | |

Semantics for the syntax elements shown in Table 5 above may be as follows.

TABLE 6 num_units_in_tick is the number of time units of a clock operating at the frequency
time_scale Hz that corresponds to one increment (called a clock tick) of a clock tick counter.
num_units_in_tick shall be greater than 0. A clock tick, in units of seconds, is equal to the
quotient of num_units_in_tick divided by time_scale. For example, when the picture rate of a
video signal is 25 Hz, time_scale may be equal to 27 000 000 and num_units_in_tick may be
equal to 1 080 000, and consequently a clock tick may be equal to 0.04 seconds.
time_scale is the number of time units that pass in one second. For example, a time
coordinate system that measures time using a 27 MHz clock has a time scale of 27 000 000.
The value of time_scale shall be greater than 0.
general_nal_hrd_params_present_flag equal to 1 specifies that NAL HRD parameters
(pertaining to Type II bitstream conformance point) are present in the
general_hrd_parameters( ) syntax structure. general_nal_hrd_params_present_flag equal to 0
specifies that NAL HRD parameters are not present in the general_hrd_parameters( ) syntax
structure.
    NOTE 1 - When general_nal_hrd_params_present_flag is equal to 0, the conformance of the
    bitstream cannot be verified without provision of the NAL HRD parameters and all BP SEI
    messages, and, when general_vcl_hrd_params_present_flag is also equal to 0, all PT and DU
    information SEI messages, by some means not specified in this Specification.
The variable NalHrdBpPresentFlag is derived as follows:
-    If one or more of the following conditions are true, the value of NalHrdBpPresentFlag is
    set equal to 1:
    -    general_nal_hrd_params_present_flag is present in the bitstream and is equal to 1.
    -    The need for presence of BPs for NAL HRD operation to be present in the bitstream
        in BP SEI messages is determined by the application, by some means not specified in
        this Specification.

TABLE 6-continued

- Otherwise, the value of NalHrdBpPresentFlag is set equal to 0.

general_vcl_hrd_params_present_flag equal to 1 specifies that VCL HRD parameters (pertaining to Type I bitstream conformance point) are present in the general_hrd_parameters( ) syntax structure. general_vcl_hrd_params_present_flag equal to 0 specifies that VCL HRD parameters are not present in the general_hrd_parameters( ) syntax structure.

NOTE 2 - When general_vcl_hrd_params_present_flag is equal to 0, the conformance of the bitstream cannot be verified without provision of the VCL HRD parameters and all BP SEI messages, and when general_nal_hrd_params_present_flag is also equal to 0, all PT and DU information SEI messages, by some means not specified in this Specification.

The variable VclHrdBpPresentFlag is derived as follows:
- If one or more of the following conditions are true, the value of VclHrdBpPresentFlag is set equal to 1:
  - general_vcl_hrd_params_present_flag is present in the bitstream and is equal to 1.
  - The need for presence of BPs for VCL HRD operation to be present in the bitstream in BP SEI messages is determined by the application, by some means not specified in this Specification.
- Otherwise, the value of VclHrdBpPresentFlag is set equal to 0.

The variable CpbDpbDelaysPresentFlag is derived as follows:
- If one or more of the following conditions are true, the value of CpbDpbDelaysPresentFlag is set equal to 1:
  - general_nal_hrd_params_present_flag is present in the bitstream and is equal to 1.
  - general_vcl_hrd_params_present_flag is present in the bitstream and is equal to 1.
  - The need for presence of CPB and DPB output delays to be present in the bitstream in PT SEI messages is determined by the application, by some means not specified in this Specification.
- Otherwise, the value of CpbDpbDelaysPresentFlag is set equal to 0.

It is a requirement of bitstream conformance that the values of general_nal_hrd_params_present_flag and general_vcl_hrd_params_present_flag in each general_hrd_parameters( ) syntax structure shall not be both equal to 0.

general_same_pic_timing_in_all_ols_flag equal to 1 specifies that the non-scalable-nested PT SEI message in each AU applies to the AU for any OLS in the bitstream and no scalable-nested PT SEI messages are present. general_same_pic_timing_in_all_ols_flag equal to 0 specifies that the non-scalable-nested PT SEI message in each AU may or may not apply to the AU for any OLS in the bitstream and scalable-nested PT SEI messages may be present.

general_decoding_unit_hrd_params_present_flag equal to 1 specifies that DU level HRD parameters are present and the HRD may operate at AU level or DU level.

general_decoding_unit_hrd_params_present_flag equal to 0 specifies that DU level HRD parameters are not present and the HRD operates at AU level. When general_decoding_unit_hrd_params_present_flag is not present, its value is inferred to be equal to 0.

tick_divisor_minus2 is used to specify the clock sub-tick. A clock sub-tick is the minimum interval of time that can be represented in the coded data when general_decoding_unit_hrd_params_present_flag is equal to 1.

bit_rate_scale (together with bit_rate_value_minus1[ i ][ j ]) specifies the maximum input bit rate of the j-th CPB when Htid is equal to i.

cpb_size_scale (together with cpb_size_value_minus1[ i ][ j ]) specifies the CPB size of the j-th CPB when Htid is equal to i and when the CPB operates at the AU level.

cpb_size_du_scale (together with cpb size_du_value_minus1[ i ][ j ]) specifies the CPB size of the j-th CPB when Htid is equal to i and when the CPB operates at DU level.

hrd_cpb_cnt_minus1 plus 1 specifies the number of alternative CPB delivery schedules. The value of hrd_cpb_cnt_minus1 shall be in the range of 0 to 31, inclusive.

When an ols_hrd_parameters( ) syntax structure is included in a VPS, the OLSs to which the ols_hrd_parameters( ) syntax structure applies are specified by the VPS. When an ols_hrd_parameters( ) syntax structure is included in an SPS, the ols_hrd_parameters( ) syntax structure applies to the OLS that includes only the layer that is the lowest layer among the layers that refer to the SPS, and this lowest layer is an independent layer.

fixed_pic_rate_general_flag[ i ] equal to 1 indicates that, when Htid is equal to i, the temporal distance between the HRD output times of consecutive pictures in output order is constrained as specified below. fixed_pic_rate_general_flag[ i ] equal to 0 indicates that this constraint may not apply.

When fixed_pic_rate_general_flag[ i ] is not present, it is inferred to be equal to 0.

fixed_pic_rate_within_cvs_flag[ i ] equal to 1 indicates that, when Htid is equal to i, the temporal distance between the HRD output times of consecutive pictures in output order is constrained as specified below. fixed_pic_rate_within_cvs_flag[ i ] equal to 0 indicates that this constraint may not apply.

When fixed_pic_rate_general_flag[ i ] is equal to 1, the value of fixed_pic_rate_within_cvs_flag[ i ] is inferred to be equal to 1.

elemental_duration_in_tc_minus1[ i ] plus 1 (when present) specifies, when Htid is equal to i, the temporal distance, in clock ticks, between the elemental units that specify the HRD output times of consecutive pictures in output order as specified below. The value of elemental_duration_in_tc_minus1[ i ] shall be in the range of 0 to 2047, inclusive.

When Htid is equal to i and fixed_pic_rate_general_flag[ i ] is equal to 1 for a CVS containing picture n, and picture n is a picture that is output and is not the last picture in the bitstream (in output order) that is output, the value of the variable DpbOutputElementalInterval[ n ] is specified by:

$$DpbOutputElementalInterval[ n ] = DpbOutputInterval[ n ] , elementalOutputPeriods \qquad (111)$$

where DpbOutputInterval[ n ] is specified in Equation C.16 and elementalOutputPeriods is specified as follows:

TABLE 6-continued

- If a PT SEI message is present for picture n, elementalOutputPeriods is equal to the value of pt_display_elemental_periods_minus1 + 1.
- Otherwise, elementalOutputPeriods is equal to 1.

When Htid is equal to i and fixed_pic_rate_general_flag[ i ] is equal to 1 for a CVS containing picture n, and picture n is a picture that is output and is not the last picture in the bitstream (in output order) that is output, the value computed for DpbOutput ElementalInterval[ n ] shall be equal to ClockTick * ( elemental_duration_in_tc_minus1[ i ] + 1 ), wherein ClockTick is as specified in Equation C.1 (using the value of ClockTick for the CVS containing picture n) when one of the following conditions is true for the following picture in output order nextPicInOutputOrder that is specified for use in Equation C.16:
- picture nextPicInOutputOrder is in the same CVS as picture n.
- picture nextPicInOutputOrder is in a different CVS and fixed_pic_rate_general_flag[ i ] is equal to 1 in the CVS containing picture nextPicInOutputOrder, the value of ClockTick is the same for both CVSs, and the value of elemental_duration_in_tc_minus1[ i ] is the same for both CVSs.

When Htid is equal to i and fixed_pic_rate_within_cvs_flag[ i ] is equal to 1 for a CVS containing picture n, and picture n is a picture that is output and is not the last picture in the CVS (in output order) that is output, the value computed for DpbOutputElementalInterval[ n ] shall be equal to ClockTick * ( elemental_duration_in_tc_minus1[ i ] + 1 ), wherein ClockTick is as specified in Equation C.1 (using the value of ClockTick for the CVS containing picture n) when the following picture in output order nextPicInOutputOrder that is specified for use in Equation C.16 is in the same CVS as picture n.

low_delay_hrd_flag[ i ] specifies the HRD operational mode, when Htid is equal to i, as specified in Annex C. When not present, the value of low_delay_hrd_flag[ i ] is inferred to be equal to 0.

NOTE 3 - When low_delay_hrd_flag[ i ] is equal to 1, "big pictures" that violate the nominal CPB removal times due to the number of bits used by an AU are permitted. It is expected, but not required, that such "big pictures" occur only occasionally.

bit_rate_value_minus1[ i ][ j ] (together with bit_rate_scale) specifies the maximum input bit rate for the j-th CPB with Htid equal to i when the CPB operates at the AU level.
bit_rate_value_minus1[ i ][ j ] shall be in the range of 0 to $2^{32} - 2$, inclusive. For any j greater than 0 and any particular value of i, bit_rate_value_minus1[ i ] [ j ] shall be greater than bit_rate_value_minus1[ i ][ j − 1 ].

When DecodingUnitHrdFlag is equal to 0, the following applies:
- The bit rate in bits per second is given by:
    BitRate[ i ][ j ] = ( bit_rate_value_minus1[ i ][ j ] + 1 ) * $2^{( 6 + bit\_rate\_scale )}$    (112)
- When the bit_rate_value_minus1[ i ][ j ] syntax element is not present, it is inferred as follows:
    - If general_hrd_params_present_flag is equal to 1, bit_rate_value_minus1[ i ][ j ] is inferred to be equal to bit_rate_value_minus1[ sps_max_sublayers_minus1 ][ j ].
    - Otherwise (general_hrd_params_present_flag is equal to 0), the value of BitRate[ i ][ j ] is inferred to be equal to CpbBrVclFactor * MaxBR for VCL HRD parameters and to be equal to CpbBrNalFactor * MaxBR for NAU HRD parameters, where MaxBR, CpbBrVclFactor and CpbBrNalFactor are specified in Annex A.

cpb_size_value_minus1[ i ][ j ] is used together with cpb_size_scale to specify the j-th CPB size with Htid equal to i when the CPB operates at the AU level.
cpb_size_value_minus1[ i ][ j ] shall be in the range of 0 to $2^{32} - 2$, inclusive. For any j greater than 0 and any particular value of i, cpb_size_value_minus1[ i ][ j ] shall be less than or equal to cpb_size_value_minus1[ i ][ j − 1 ].

When DecodingUnitHrdFlag is equal to 0, the following apples:
- The CPB size in bits is given by:
    CpbSize[ i ][ j ] = ( cpb_size_value_minus1[ i ][ j ] + 1 ) * $2^{( 4 + cpb\_size\_scale )}$    (113)
- When the cpb_size_value_minus1[ i ][ j ] syntax element is not present, it is inferred as follows:
    - If general_hrd_params_present_flag is equal to 1, cpb_size_value_minus1[ i ][ j ] is inferred to be equal to cpb_size_value_minus1[ sps_max_sublayers_minus1 ][j ].
    - Otherwise (general_hrd_params_present_flag is equal to 0), the value of CpbSize[ i ][ j ] is inferred to be equal to CpbBrVclFactor * MaxCPB for VCL HRD parameters and to be equal to CpbBrNalFactor * MaxCPB for NAU HRD parameters, where MaxCPB, CpbBrVclFactor and CpbBrNalFactor are specified in Annex A.

cpb_size_du_value_minus1[ i ][ j ] is used together with cpb_size_du_scale to specify the i-th CPB size with Htid equal to i when the CPB operates at DU level.
cpb_size_du_value_minus1[ i ][ j ] shall be in the range of 0 to $2^{32} - 2$, inclusive. For any j greater than 0 and any particular value of i, cpb_size_du_value_minus1[ i ][ j ] shall be less than or equal to cpb_size_du_value_minus1[ i ][ j − 1 ].

When DecodingUnitHrdFlag is equal to 1, the following applies:
- The CPB size in bits is given by:
    Cpb Size[ i ][ j ] = ( cpb_size_du_value_minus1[ i ][ j ] + 1 ) * $2^{( 4 + cpb\_size\_du\_scale )}$    (114)
- When the cpb_size_du_value_minus1[ i ][ j ] syntax element is not present, it is inferred as follows:
    - If general_hrd_params_present_flag is equal to 1, cpb_size_du_value_minus1[ i ][ j ] is inferred to be equal to cpb_size_du_value_minus1[ sps_max_sublayers_minus1 ][ j ].
    - Otherwise (general_hrd_params_present_flag is equal to 0), the value of CpbSize[ i ][ j ] is inferred to be equal to CpbVclFactor * MaxCPB for VCL HRD parameters and to be equal to CpbNalFactor * MaxCPB for NAL HRD parameters, where MaxCPB, CpbVclFactor and CpbNalFactor are specified in Annex A.

TABLE 6-continued bit_rate_du_value_minus1[ i ][ j ] (together with bit_rate_scale) specifies the maximum
input bit rate for the j-th CPB with Htid equal to i when the CPB operates at the DU level.
bit_rate_du_value_minus1[ i ][ j ] shall be in the range of 0 to $2^{32} - 2$, inclusive. For any j
greater than 0 and any particular value of i, bit_rate_du_value_minus1[ i ][ j ] shall be greater
than bit_rate_du_value_minus1[ i ][ j − 1 ].
When DecodingUnitHrdFlag is equal to 1, the folowing applies:
- The bit rate in bits per second is given by:
    BitRate [ i ][ j ] = ( bit_rate_du_value_minus1[ i ][ j ] + 1 ) * $2^{( 6 + bit\_rate\_scale )}$  (115)
- When the bit_rate_du_value_minus1[ i ][ j ] syntax element is not present, it is inferred
as follows:
    - If general_hrd_params_present_flag is equal to 1, bit_rate_du_value_minus1[ i ][ j ]
      is inferred to be equal to
      bit_rate_du_value_minus1[ sps_max_sublayers_minus1 ][ j ].
    - Otherwise (general_hrd_params_present_flag is equal to 0), the value of
      BitRate[ i ][ j ] is inferred to be equal to BrVclFactor * MaxBRfor VCL HRD
      parameters and to be equal to BrNalFactor * MaxBR for NAL HRD parameters,
      where MaxBR, BrVclFactor and BrNalFactor are specified in Annex A.
cbr_flag[ i ][ j ] equal to 0 specifies that to decode this bitstream by the HRD using the j-th
CPB specification, the hypothetical stream scheduler (HSS) operates in an intermittent bit
rate mode. cbr_flag[ i ][ j ] equal to 1 specifies that the HSS operates in a constant bit rate
(CBR) mode.
When not present, the value of cbr_flag[ i ][ j ] it is inferred as follows:
- When the cbr_flag[ i ][ j ] syntax element is not present, it is inferred as follows:
    - If general_hrd_params_present_flag is equal to 1, cbr_flag[ i ][ j ] is inferred to be
      equal to cbr_flag[ sps_max_sublayers_minus1 ][ j ].
    - Otherwise (general_hrd_params_present_flag is equal to 0), the value of
      cbr_flag[ i ][ j ] is inferred to be equal to 0.

For example, the syntax element num_units_in_tick may be the number of time units of a clock operating at frequency_time_scale Hz corresponding to one increment of a clock tick counter (referred to as a clock tick). num_units_in_tick may be greater than 0. A clock tick (units of seconds) may be equal to the quotient of num_units_in_tick divided by time_scale. For example, when the picture rate of a video signal is 25 Hz, time_scale may be equal to 27,000,000, num_units_in_tick may be equal to 1,080,000, and as a result, the clock tick may be 0.04 second.

Also, for example, the syntax element time_scale may be the number of time units that elapse in one second. For example, a time coordinate system for measuring time using a 27 MHz clock may have a time_scale of 27,000,000. The value of time_scale may be greater than 0.

Also, for example, a syntax element general_nal_hrd_params_present_flag equal to 1 may indicate that a NAL HRD parameter (related to a type II bitstream conformance point) exists in the general_hrd_parameters( ) syntax structure. A syntax element general_nal_hrd_params_present_flag equal to 0 may indicate that the NAL HRD parameter does not exist in the general_hrd_parameters( ) syntax structure.

Also, the variable NalHrdBpPresentFlag may be derived as follows.
  If one or more of the following conditions are true, the value of NalHrdBpPresentFlag may be set to 1.
    general_nal_hrd_params_present_flag is present in the bitstream and is equal to 1.
    The necessity of the existence of a BP for the NAL HRD operation in the bitstream of the BP SEI message is determined by any means, the application not specified in this specification.
  Otherwise, the value of NalHrdBpPresentFlag is set to 0.

Also, for example, a syntax element general_vcl_hrd_params_present_flag equal to 1 may indicate that a VCL HRD parameter (related to a type I bitstream conformance point) exists in the general_hrd_parameters( ) syntax structure. A syntax element general_vcl_hrd_params_present_flag equal to 0 may indicate that the VCL HRD parameter does not exist in the general_hrd_parameters( ) syntax structure.

Also, the variable Vc1HrdBpPresentFlag may be derived as follows.
  If one or more of the following conditions are true, the value of VclHrdBpPresentFlag may be set to 1.
    general_nal_hrd_params_present_flag exists in the bitstream and is equal to 1.
    The necessity of the existence of a BP for the NAL HRD operation existed in the bitstream of the BP SEI message is determined by any means, the application not specified in this specification.
  Otherwise, the value of VclHrdBpPresentFlag is set to 0.

Also, the variable CpbDpbDelaysPresentFlag may be derived as follows.
  If one or more of the following conditions are true, the value of CpbDpbDelaysPresentFlag may be set to 1.
    general_nal_hrd_params_present_flag exists in the bitstream and is equal to 1.
    The necessity of the existence of CPB and DPB output delays in the bitstream of PT SEI messages is determined by any means, application not specified in this specification.
  Otherwise, the value of CpbDpbDelaysPresentFlag is set to 0.

On the other hand, it may be a requirement of bitstream conformance that the values of general_nal_hrd_params_present_flag and general_vcl_hrd_params_present_flag in each general_hrd_parameters( ) syntax structure should not all be 0.

In addition, for example, a syntax element general_same_pic_timing_in_all_ols_flag equal to 1 may indicate that a non-scalable-nested PT SEI message of each AU is applied to the AUs for all OLSs of the bitstream and there is no scalable-nested PT SEI message. The syntax element general_same_pic_timing_in_all_ols_flag equal to 0 may indicate that the non-scalable-nested PT SEI message of each AU may or may not be applied to the AU for any OLS of the bitstream and a scalable-nested PT SEI message may exist.

Also, for example, a syntax element general_decoding_unit_hrd_params_present_flag equal to 1 may indicate that a DU level HRD parameter exists and the HRD may operate at an AU level or a DU level. A syntax element general_decoding_unit_hrd_params_present_flag equal to 0 may indicate that the DU level HRD parameter may not exist and the HRD may operate at the AU level. When general_decoding_unit_hrd_params_present_flag does not exist, the value of general_decoding_unit_hrd_params_present_flag may be inferred as 0.

Also, for example, the syntax element tick_divisor_minus2 may be used to specify a clock sub-tick. The clock sub-tick may be a minimum interval of time that can be expressed in coded data when general_decoding_unit_hrd_params_present_flag is 1.

Also, for example, the syntax element bit_rate_scale (together with bit_rate_value_minus1[i][j]) may indicate the maximum input bit rate of the j-th CPB when Htid is equal to i.

Also, for example, the syntax element cpb_size_scale (with cpb_size_value_minus1[i][j]) may indicate the CPB size of the j-th CPB when Htid is equal to i and the CPB operates at the AU level.

Also, for example, the syntax element cpb_size_du_scale (with cpb_size_du_value_minus1[i][j]) may indicate the CPB size of the j-th CPB when Htid is equal to i and the CPB operates at the DU level.

Also, for example, a value obtained by adding 1 to the syntax element hrd_cpb_cnt_minus1 may indicate the number of alternative CPB delivery schedules. The value of hrd_cpb_cnt_minus1 may be in the range of 0 to 31. In addition, when the VPS includes the ols_hrd_parameters( ) syntax structure, the OLS to which the ols_hrd_parameters( ) syntax structure is applied may be specified in the VPS. When the SPS includes the ols_hrd_parameters( ) syntax structure, the ols_hrd_parameters( ) syntax structure may be applied to the OLS including only the lowest layer among the layers referring to the SPS, and the lowest layer may be an independent layer.

Also, for example, a syntax element fixed_pic_rate_general_flag[i] equal to 1 may indicate that, when Htid is equal to i, the temporal distance between HRD output times of consecutive pictures in an output order is constrained as follows. A syntax element fixed_pic_rate_general_flag[i] equal to 0 may indicate that the constraint is not applied.

Also, for example, a syntax element fixed_pic_rate_within_cvs_flag[i] equal to 1 may indicate that, when Htid is equal to i, the temporal distance between HRD output times of consecutive pictures in an output order is constrained as follows. A syntax element fixed_pic_rate_within_cvs_flag[i] equal to 0 may indicate that the constraint is not applied. On the other hand, when fixed_pic_rate_general_flag[i] is 1, the value of fixed_pic_rate_within_cvs_flag[i] may be inferred to be equal to 1.

Also, for example, a value obtained by adding 1 to the syntax element elemental_duration_in_tc_minus1[i] may indicate the temporal distance (clock tick unit) between elemental units that specifies the HRD output time of consecutive pictures in the output order as specified below when Htid is equal to i. The value of elemental_duration_in_tc_minus1[i] may be in the range of 0 to 2047.

When Htid is equal to i, fixed_pic_rate_general_flag[i] is equal to 1 for CVS containing picture n, and the picture n is the output picture and is not the last picture (in output order) of the output bitstream, the variable DpbOutputElementalInterval[n] may be specified as DpbOutputElementalInterval[n]=DpbOutputInterval[n]/elementalOutputPeriods.

Here, DpbOutputInterval[n] may be specified as Equation C.16 of VVC standard, and elementalOutputPeriods may be specified as follows.

If there is a PT SEI message for picture n, elementalOutputPeriods may be equal to a value of pt display elemental periods minus1+1.

Otherwise, elementalOutputPeriods may be equal to 1.

When Htid is equal to i, fixed_pic_rate_general_flag[i] is equal to 1 for CVS containing picture n, and picture n is the output picture and is not the last picture (in output order) of the output bitstream, the calculated value of DpbOutputElementalInterval[n] may be equal to ClockTick*(elemental_duration_in_tc_minus1[i]+1). Here, when one of the following conditions is true for the next picture in the output order nextPicInOutputOrder specified to be used in Equation C.16 of the VVC standard, ClockTick may be specified as Equation C.16 of the VVC standard (using the value of ClockTick for the CVS containing picture n).

Picture nextPicInOutputOrder is in the same CVS as picture n.

picture nextPicInOutputOrder is in different CVS, fixed_pic_rate_general_flag[i] is equal to 1 in CVS containing picture nextPicInOutputOrder, a value of ClockTick is same for both CVSs, and a value of elemental_duration_in_tc_minus1[i] is same for both CVSs.

When Htid is equal to i, fixed_pic_rate_within cvs flag[i] is equal to 1 for CVS containing picture n, and picture n is the output picture and is not the last picture (in output order) in the output CVS, the calculated value for DpbOutputElementalInterval[n] may be equal to ClockTick*(elemental_duration_in_tc_minus1[i]+1). Here, when one of the following conditions is true for the next picture in the output order nextPicInOutputOrder specified to be used in Equation C.16 of the VVC standard, ClockTick may be specified as Equation C.1 of the VVC standard (using the value of ClockTick for the CVS containing picture n).

Also, for example, the syntax element low_delay_hrd_flag[i] may indicate an HRD operational mode as disclosed in Annex C when Htid is equal to i. When low_delay_hrd_flag[i] does not exist, the value of low_delay_hrd_flag[i] may be inferred to be equal to 0.

Also, for example, the syntax element bit_rate_value_minus1[i][j] may indicate the maximum input bit rate for the j-th CPB with Htid equal to i when the CPB operates at the AU level (along with bit_rate_scale). bit_rate_value_minus1[i][j] may be in the range of 0 to 232-2. For a specific value of j and i greater than 0, bit_rate_value_minus1[i][j] may be greater than bit_rate_value_minus1[i][j−1].

Also, for example, the syntax element cpb_size_value_minus1[i][j] may be used together with cpb_size_scale to indicate the j-th CPB size with Htid equal to i when the CPB operates at the AU level. cpb_size_value_minus1[i][j] may be in the range of 0 to 232-2. For a specific value of j and i greater than 0, cpb_size_value_minus1[i][j] may be less than or equal to cpb_size_value_minus1[i][j−1].

Also, for example, the syntax element cpb_size_du_value_minus1[i][j] may be used together with cpb_size_du_scale to indicate the i-th CPB size with Htid equal to i when the CPB operates at the DU level. cpb_size_du_value_minus1[i][j] may be in the range of 0 to 232-2. For specific values of j and i greater than 0, cpb_size_du_value_minus1[i][j] may be less than or equal to cpb_size_du_value_minus1[i][j−1].

Also, for example, the syntax element bit_rate_du_value_minus1[i][j] may indicate the maximum input bit rate for the j-th CPB with Htid equal to i when the CPB operates at the DU level (along with bit_rate_scale). bit_rate_du_value_minus1[i][j] may be in the range of 0 to 232-2. For specific values of j and i greater than 0, bit_rate_du_value_minus1[i][j] may be greater than bit_rate_du_value_minus1[i][j−1].

In addition, for example, the syntax element cbr_flag[i][j] equal to 0 may indicate that HSS (hypothetical stream scheduler) operates in the intermittent bit rate mode to decode the bitstream by HRD using the j-th CPB specification. The syntax element cbr_flag[i][j] equal to 1 may indicate that the HSS operates in the constant bit rate (CBR) mode.

Meanwhile, the output time of Table 6 may be a time at which a decoded picture from the DPB (for decoded pictures output from the DPB) is output as specified by the HRD according to the DPB operation.

Also, for example, two sets of HRD parameters (NAL HRD parameters and VCL HRD parameters) may be used. The HRD parameter may be signaled through the general_hrd_parameters( ) syntax structure and the ols_hrd_parameters( ) syntax structure that are part of the VPS or part of the SPS.

For example, DPB management may be performed based on the HRD parameter. As an example, removal of a picture and/or (decoded) output of a picture in the DPB before decoding of the current picture may be performed based on the HRD parameter.

Meanwhile, according to the existing VVC standard, when the OLS includes only one layer, HRD-related information for the OLS may exist in the SPS referenced by the layer. On the other hand, when the OLS includes a plurality of layers, the HRD-related information on the OLS may exist in a video parameter set (VPS) together with HRD-related information on other OLS including a plurality of layers. Here, the OLS including only one layer may be referred to as a single-layered OLS (OLS), and the OLS including a plurality of layers may be referred to as a multi-layered OLS (OLS).

In addition, according to the existing VVC standard, signaling of HRD-related information for single-layered OLS in SPS is an option controlled by sps_general_hrd_params_present_flag, but signaling of HRD-related information for multi-layered OLSs in VPS may be present for all of the multi-layered OLSs or may not be present for all. Accordingly, if the existence of HRD-related information for multi-layered OLSs can be made an individual option for the multi-layered OLSs, coding efficiency may be further improved.

Accordingly, the present disclosure proposes a solution to the above-described problem. The proposed embodiments may be applied individually or in combination.

As an example, signaling of the HRD index associated with each OLS of the VPS may be coded as u(v) instead of ue(v). That is, for example, the HRD index for each OLS of the VPS may be coded as u(v) instead of ue(v). Here, the number of bits for signaling may be equal to the log2 upper limit of the number of HRDs for OLS signaled in the VPS (i.e., Ceil(Log2(num_ols_hrd_params_minus1+1))).

Also, ue(v) and u(v) may be descriptors indicating a parsing process of a syntax element.

For example, the syntax element coded with ue(v) may be a syntax element coded with an unsigned integer 0-th order exponential Golomb (Exp-Golomb) parsing process. That is, for example, the syntax element coded with ue(v) may be coded with an unsigned integer 0-th order exponential Golomb (Exp-Golomb) parsing process.

Specifically, for example, the integer zero-order exponential Golomb parsing process may be performed as follows.

The integer 0-th order exponential Golomb parsing process for a syntax element may start with reading the bits including the first non-zero bit from the current position of the bitstream and counting the number of leading bits equal to zero. The above process may be represented as in the following table.

TABLE 7

| leadingZeroBits = −1 |
| for( b = 0; !b; leadingZeroBits++ ) |
| b = read_bits( 1 ) |

In addition, a variable 'codeNum' may be derived as shown in the following equation.

$$\text{codeNum} = 2^{leadingZeroBits} - 1 + \text{read\_bits(leadingZeroBits)} \quad [\text{Equation 1}]$$

Herein, a value returned from read_bits(leadingZeroBits), that is, a value indicated by read_bits(leadingZeroBits), may be interpreted as binary representation of an unsigned integer for a most significant bit recorded first.

A structure of an Exp-Golomb code in which a bit string is divided into a "prefix" bit and a "suffix" bit may be represented as shown in the following table.

TABLE 8

| Bit string form | Range of codeNum |
| --- | --- |
| 1 | 0 |
| 0 1 $x_0$ | 1 . . . 2 |
| 0 0 1 $x_1$ $x_0$ | 3 . . . 6 |
| 0 0 0 1 $x_2$ $x_1$ $x_0$ | 7 . . . 14 |
| 0 0 0 0 1 $x_3$ $x_2$ $x_1$ $x_0$ | 15 . . . 30 |
| 0 0 0 0 0 1 $x_4$ $x_3$ $x_2$ $x_1$ $x_0$ | 31 . . . 62 |
| . . . | . . . |

The "prefix" bit may be a bit parsed as described above to calculate leadingZeroBits, and may be represented by 0 or 1 of a bit string in Table 8. That is, the bit string disclosed by 0 or 1 in Table 8 above may represent a prefix bit string. The "suffix" bit may be a bit parsed in the computation of codeNum, and may be represented by xi in Table 8 above. That is, a bit string disclosed as xi in Table 8 above may represent a suffix bit string. Herein, i may be a value in the range of LeadingZeroBits−1. In addition, each xi may be equal to 0 or 1.

A bit string assigned to the codeNum may be as shown in the following table.

TABLE 9

| Bit string | codeNum |
| --- | --- |
| 1 | 0 |
| 0 1 0 | 1 |
| 0 1 1 | 2 |
| 0 0 1 0 0 | 3 |
| 0 0 1 0 1 | 4 |
| 0 0 1 1 0 | 5 |
| 0 0 1 1 1 | 6 |
| 0 0 0 1 0 0 0 | 7 |
| 0 0 0 1 0 0 1 | 8 |
| 0 0 0 1 0 1 0 | 9 |
| . . . | . . . |

If a descriptor of the syntax element is ue(v), that is, if the syntax element is coded with ue(v), a value of the syntax element may be equal to codeNum.

Also, for example, the syntax element coded with u(v) may be a syntax element coded with an unsigned integer using v bits. That is, for example, the syntax element coded as u(v) may be coded as an unsigned integer using v bits.

Here, v may be derived based on a value of other syntax element. The parsing process of u(v) may be specified by the return value of the read_bits(v) function in which the most significant bit is interpreted as a binary representation of an unsigned integer written first.

That is, the above-described embodiment proposes a method of coding the HRD index for each OLS of the VPS with u(v) instead of ue(v). Here, the number of bits for signaling may be equal to the log2 upper limit of the number of HRDs for OLS signaled in the VPS (i.e., Ceil(Log2 (num_ols_hrd_params_minus1+1))).

Also, as an example, in the case of HRD signaling for an OLS including one or more layers, the HRD for a specific OLS may be optional. That is, in the case of HRD signaling for an OLS including one or more layers, this embodiment proposes a method of adjusting the HRD for a specific OLS to be optional.

Also, as an example, a flag indicating whether an HRD index exists for each OLS including one or more layers may be signaled. That is, this embodiment proposes a method of signaling a flag indicating whether an HRD index for an OLS including one or more layers exists. Here, the syntax element of the flag may be ols_hrd_present_flag[i]. Meanwhile, when the flag does not exist, that is, when the flag is not signaled, the corresponding OLS may have no HRD-related information.

Also, as an example, when vps_general_hrd_params_present_flag is 1, there may be at least one ols_hrd_present_flag[i] having a value of 1, where i may be in the range of 0 to TotalNumOlss−1.

Also, as an example, a specific value of the HRD index for the OLS may be assigned to mean that the OLS does not have HRD-related information/parameters. That is, the present embodiment proposes a method in which a specific value of the HRD index indicates that the OLS does not have HRD-related information/parameters. For this, the following may be applied.

a) Change ols_hrd_idx[i] to ols_hrd_idx_plus1[i].

b) If ols_hrd_idx_plus1[i] is 0, ols_hrd_idx_plus1[i] may mean that there is no HRD parameter in the i-th OLS, otherwise the HRD index of the HRD parameter structure for the i-th OLS may be derived as ols_hrd_idx_plus1[i]−1.

c) ols_hrd_idx_plus1[i] may be coded with u(v) having the same number of bits as Ceil(Log2(num_ols_hrd_params_minus1+2)).

Also, as an example, when vps_general_hrd_params_present_flag is 1, there may be at least one ols_hrd_idx_plus1[i] whose value is not 0, where i may be in the range of 0 to TotalNumOlss−1.

Meanwhile, for example, embodiment(s) may be applied according to the following procedure.

FIG. 4 exemplarily illustrates an encoding procedure according to an embodiment of the present disclosure.

Referring to FIG. 4, the encoding apparatus may derive the HRD parameter (S400). The encoding apparatus may encode image information including HRD parameter related information (S410). Meanwhile, the HRD parameter related information may include the information/syntax element disclosed in the embodiments of the present disclosure. Also, for example, DPB management may be performed based on HRD parameters. As an example, removal of a picture and/or output of a (decoded) picture in the DPB before decoding of the current picture may be performed based on the HRD parameter.

FIG. 5 exemplarily illustrates a decoding procedure according to an embodiment of the present disclosure.

Referring to FIG. 5, the decoding apparatus may obtain image information including HRD parameter related information from the bitstream (S500). The decoding apparatus may decode a picture based on the HRD parameter related information (S510).

FIG. 6 exemplarily illustrates a decoding procedure according to an embodiment of the present disclosure.

Referring to FIG. 6, the decoding apparatus may obtain image information including HRD parameter related information from the bitstream (S600). The decoding apparatus may manage the DPB based on the HRD parameter related information (S610). For example, DPB management may be performed based on HRD parameters. As an example, removal of a picture and/or output of a (decoded) picture in the DPB before decoding of the current picture may be performed based on the HRD parameters.

Thereafter, the decoding apparatus may decode the picture based on the DPB (S620). For example, the decoding apparatus may decode the current picture based on inter prediction for the block/slice of the current picture using the decoded picture (prior to the current picture) of the DPB as a reference picture. Meanwhile, although not shown, the decoded current picture may be inserted into the DPB, and the DPB including the decoded current picture may be further updated based on the DPB parameter before decoding the next picture.

The syntax and DPB management process to which the embodiments proposed in the present disclosure are applied may be as described below.

In an embodiment, the signaled video parameter set (VPS) syntax may be as follows.

TABLE 10

| | Descriptor |
|---|---|
| video_parameter_set_rbsp( ) { | |
| ... | |
| if( !each_layer_is_an_ols_flag ) | |
|   vps_general_hrd_params_present_flag | u(1) |
| if( vps_general_hrd_params_present_flag ) { | |
|   general_hrd_parameters( ) | |
|   if( vps_max_sublayers_minus1 > 0 ) | |
|     vps_sublayer_cpb_params_present_flag | u(1) |
|   num_ols_hrd_params_minus1 | ue(v) |
|   for( i = 0; i <= num_ols_hrd_params_minus1; i++ ) { | |
|     if( vps_max_sublayers_minus1 > 0 && !vps_all_layers_same_num_sublayers_flag ) | |
|       hrd_max_tid[ i ] | u(3) |
|     firstSubLayer = vps_sublayer_cpb_params_present_flag ? 0 : hrd_max_tid[ i ] | |
|     ols_hrd_parameters( firstSubLayer, hrd_max_tid[ i ] ) | |
|   } | |
|   if( num_ols_hrd_params_minus1 + 1 != TotalNumOlss && num_ols_hrd_params_minus1 > 0 ) | |
|     for( i = 1; i < TotalNumOlss; i++ ) | |
|       if( NumLayersInOls[ i ] > 1 ) { | |
|         ols_hrd_present_flag[ i ] | u(1) |
|         if( ols_hrd_present_flag[ i ] ) | |
|           ols_hrd_idx[ i ] | ue(v) |
|       } | |
| } | |
| ... | |
| } | |

Referring to Table 10, the VPS may include syntax elements of vps_general_hrd_params_present_flag, vps_sublayer_cpb_params_present_flag, num_ols_hrd_params_minus1 and/or hrd_max_tid[i].

Also, referring to Table 10, the VPS may further include a syntax element ols_hrd_present_flag[i] as in the embodiment proposed in the present disclosure.

For example, the syntax element ols_hrd_present_flag[i] may indicate whether ols_hrd_idx[i] exists. For example, when the value of ols_hrd_present_flag[i] is 1, ols_hrd_present_flag[i] may indicate that ols_hrd_idx[i] may exist, and when the value of ols_hrd_present_flag[i] is 0, ols_hrd_present_flag[i] may indicate that ols_hrd_idx[i] does not exist. Meanwhile, when vps_general_hrd_params_present_flag is 1, there may be at least one ols_hrd_present_flag[i] having a value of 1, where i may be in the range of 0 to TotalNumOlss−1.

Also, for example, when NumLayersInOls[i] is greater than 1, the syntax element ols_hrd_idx[i] may indicate an index of the ols_hrd_parameters( ) syntax structure applied to the i-th OLS. The index may be an index of the ols_hrd_parameters( ) syntax structure list of the VPS. That is, the syntax element ols_hrd_idx[i] may indicate an index of an ols_hrd_parameters( ) syntax structure applied to the i-th OLS among a plurality of ols_hrd_parameters( ) syntax structures of the VPS. Here, the value of ols_hrd_idx[i] may be in the range of 0 to num_ols_hrd_params_minus1.

When NumLayersInOls[i] is 1, the ols_hrd_parameters( ) syntax structure applied to the i-th OLS may exist in the SPS referenced by the layer of the i-th OLS.

When the value of num_ols_hrd_param_minus1+1 is equal to TotalNumOlss, the value of ols_hrd_idx[i] may be inferred to be equal to i. Otherwise, that is, when NumLayersInOls[i] is greater than 1 and num_ols_hrd_params_minus1 is 0, the value of ols_hrd_idx[i] may be inferred to be equal to 0.

Alternatively, as an embodiment, the signaled video parameter set (VPS) syntax may be as follows.

TABLE 11

| | Descriptor |
|---|---|
| video_parameter_set_rbsp( ) { | |
| ... | |
| ... | |
| if( !each_layer_is_an_ols_flag ) | |
|   vps_general_hrd_params_present_flag | u(1) |
| if( vps_general_hrd_params_present_flag ) { | |
|   general_hrd_parameters( ) | |
|   if( vps_max_sublayers_minus1 > 0 ) | |
|     vps_sublayer_cpb_params_present_flag | u(1) |
|   num_ols_hrd_params_minus1 | ue(v) |
|   for( i = 0; i <= num_ols_hrd_params_minus1; i++ ) { | |
|     if( vps_max_sublayers_minus1 > 0 && !vps_all_layers_same_num_sublayers_flag ) | |
|       hrd_max_tid[ i ] | u(3) |
|     firstSubLayer = vps_sublayer_cpb_params_present_flag ? 0 : hrd_max_tid[ i ] | |
|     ols_hrd_parameters( firstSubLayer, hrd_max_tid[ i ] ) | |
|   } | |
|   if( num_ols_hrd_params_minus1 + 1 != TotalNumOlss && num_ols_hrd_params_minus1 > 0 ) | |
|     for( i = 1; i < TotalNumOlss; i++ ) | |
|       if( NumLayersInOls[ i ] > 1 ) | |
|         ols_hrd_idx_plus1[ i ] | ue(v) |
| } | |
| ... | |
| } | |

Referring to Table 11, the VPS may include syntax elements of vps_general_hrd_params_present_flag, vps_sublayer_cpb_params_present_flag, num_ols_hrd_params_minus1 and/or hrd_max_tid[i].

Also, referring to Table 11, the VPS may further include a syntax element ols_hrd_idx_plus1[i] as in the embodiment proposed in the present disclosure.

For example, a value obtained by subtracting 1 from the syntax element ols_hrd_idx_plus1[i] may indicate an index of the ols_hrd_parameters( ) syntax structure applied to the i-th OLS when NumLayersInOls[i] is greater than 1. The index may be an index of the ols_hrd_parameters( ) syntax structure list of the VPS. That is, a value obtained by subtracting 1 from the syntax element ols_hrd_idx_plus1[i] may indicate an index of an ols_hrd_parameters( ) syntax structure applied to the i-th OLS among a plurality of ols_hrd_parameters( ) syntax structures of the VPS. Here, the value of ols_hrd_idx_plus1[i] may be in the range of 0 to num_ols_hrd_params_minus1+1.

On the other hand, when vps_general_hrd_params_present_flag is 1, there may be at least one ols_hrd_present_flag[i] having a value of 1, where i may be in the range of 0 to TotalNumOlss−1.

When NumLayersInOls[i] is 1, the ols_hrd_parameters( ) syntax structure applied to the i-th OLS may exist in the SPS referenced by the layer of the i-th OLS.

When the value of num_ols_hrd_param_minus1+1 is equal to TotalNumOlss, the value of ols_hrd_idx[i] may be inferred to be equal to i. Otherwise, that is, when NumLayersInOls[i] is greater than 1 and num_ols_hrd_params_minus1 is 0, the value of ols_hrd_idx[i] may be inferred to be equal to 0.

On the other hand, the above-described DPB (Decoded Picture Buffer) may be conceptually composed of a sub DPB, and the sub DPB may include a picture storage buffer for storing a decoded picture of one layer. The picture storage buffer may include decoded pictures that are marked "used for reference" or retained for future output.

Also, for multilayer bitstreams, the DPB parameter may not be allocated for each Output Layer Set (OLS), but instead may be allocated for each layer. For example, a maximum of two DPB parameters may be allocated to each layer. One may be allocated when the layer is an output layer (i.e., for example, when the layer can be used for reference and future output), and the other may be allocated when the layer is not an output layer but is used as a reference layer (e.g., when the layer can be used only as a reference for a picture/slice/block of an output layer in the absence of layer switching). This is considered simpler when compared to the DPB parameters for the multilayer bitstreams of the HEVC layered extension, where each layer of the OLS has its own DPB parameter.

For example, the signaling of the DPB parameter may be the same as the syntax and semantic below.

TABLE 12

| | Descriptor |
|---|---|
| video_parameter_set_rbsp( ) { | |
| ... | |
| if( !vps_all_independent_layers_flag ) | |
|   vps_num_dpb_params | ue(v) |
| if( vps_num_dpb_params > 0 ) { | |
|   same_dpb_size_output_or_nonoutput_flag | u(1) |
|   if( vps_max_sublayers_minus 1 > 0 ) | |
|     vps_sublayer_dpb_params_present_flag | u(1) |
| } | |
| for( i = 0; i < vps_num_dpb_params; i++ ) { | |
|   dpb_size_only_flag[ i ] | u(1) |
|   if( vps_max_sublayers_minus1 > 0 && !vps_all_layers_same_num_sublayers_flag ) | |
|     dpb_max_temporal_id[ i ] | u(3) |
|   dpb_parameters( dpb_size_only_flag[ i ], dpb_max_temporal_id[ i ], vps_sublayer_dpb_params_present_flag ) | |
| } | |
| for( i = 0; i < vps_max_layers_minus1 && vps_num_dpb_params > 1; i++ ) { | |
|   if( !vps_independent_layer_flag[ i ] ) | |
|     layer_output_dpb_params_idx[ i ] | ue(v) |
|   if( LayerUsedAsRefLayerFlag[ i ] && !same_dpb_size_output_or_nonoutput_flag ) | |
|     layer_nonoutput_dpb_params_idx[ i ] | ue(v) |
| } | |
| ... | |
| } | |

For example, Table 12 described above may indicate a Video Parameter Set (VPS) including syntax elements for a signaled DPB parameter.

Semantics for the syntax elements shown in Table 12 described above may be as follows.

TABLE 13 vps_num_dpb_params specifies the number of dpb_parameters( ) syntax strutcures in the VPS. The value of vps_num_dpb_params shall be in the range of 0 to 16, inclusive. When not present, the value of vps_num_dpb_params is inferred to be equal to 0.
same_dpb_size_output_or_nonoutput_flag equal to 1 specifies that there is no layer_nonoutput_dpb_params_idx[ i ] syntax element present in the VPS.
same_dpb_size_output_or_nonoutput_flag equal to 0 specifies that there may or may not be layer_nonoutput_dpb_params_idx[ i ] syntax elements present in the VPS.
vps_sublayer_dpb_params_present_flag is used to control the presence of max_dec_pic_buffering_minus1[ ], max_num_reorder_pics[ ], and max_latency_increase_plus1[ ] syntax elements in the dpb_parameters( ) syntax strucures in the VPS. When not present, vps_sub_dpb_params_info_present flag is inferred to be equal to 0.
dpb_size_only_flag[ i ] equal to 1 specifies that the max_num_reorder_pics[ ] and max_latency_increase_plus1[ ] syntax elements are not present in the i-th dpb_parameters( ) syntax strucures the VPS. dpb_size_only_flag[ i ] equal to 0 specifies that the max_num_reorder_pics[ ] and max_latency_increase_plus1[ ] syntax elements may be present in the i-th dpb_parameters( ) syntax strucures the VPS.
dpb_max_temporal_id[ i ] specifies the TemporalId of the highest sublayer representation for which the DPB parameters may be present in the i-th dpb_parameters( ) syntax strutcure in the VPS. The value of dpb_max_temporal_id[ i ] shall be in the range of 0 to vps_max_sublayers_minus1, inclusive. When vpsmaxsublayersminus 1 is equal to 0, the value of dpb_max_temporal_id[ i ] is inferred to be equal to 0. When vps_max_sublayers_minus1 is greater than 0 and vps_all_layers_same_num_sublayers_flag is equal to 1, the value of dpb_max_temporal_id[ i ] is inferred to be equal to vps_max_sublayers_minus1.
layer_output_dpb_params_idx[ i ] specifies the index, to the list of dpb_parameters( ) syntax structures in the VPS, of the dpb_parameters( ) syntax structure that applies to the i-th layer when it is an output layer in an OLS. When present, the value of layer_output_dpb_params_idx[ i ] shall be in the range of 0 to vps_num_dpb_params − 1, inclusive.
If vps_independent_layer_flag[ i ] is equal to 1, the dpb_parameters( ) syntax structure that applies to the i-th layer when it is an output layer is the dpb_parameters( ) syntax structure present in the SPS referred to by the layer.
Otherwise (vps_independent_layer_flag[ i ] is equal to 0), the following applies:
- When vps_num_dpb_params is equal to 1, the value of layer_output_dpb_params_idx[ i ] is inferred to be equal to 0.
- It is a requirement of bitstream conformance that the value of layer_output_dpb_params_idx[ i ] shall be such that dpb_size_only_flag[ layer_output_dpb_params_idx[ i ] ] is equal to 0.
layer_nonoutput_dpb_params_idx[ i ] specifies the index, to the list of dpb_parameters( ) syntax structures in the VPS, of the dpb_parameters( ) syntax structure that applies to the i-th layer when it is a non-output layer in an OLS. When present, the value of layer_nonoutput_dpb_params_idx[ i ] shall be in the range of 0 to vps_num_dpb_params − 1, inclusive.
If same_dpb_size_output_or_nonoutput_flag is equal to 1, the following applies:
- If vps_independent_layer_flag[ i ] is equal to 1, the dpb_parameters( ) syntax structure that applies to the i-th layer when it is a non-output layer is the dpb_parameters( ) syntax structure present in the SPS referred to by the layer.
- Otherwise (vps_independent_layer_flag[ i ] is equal to 0), the value of layer_nonoutput_dpb_params_idx[ i ] is inferred to be equal to layer_output_dpb_params_idx[ i ].
Otherwise (same_dpb_size_output_or_nonoutput_flag is equal to 0), when vps_num_dpb_params is equal to 1, the value of layer_output_dpb_params_idx[ i ] is inferred to be equal to 0.

For example, the syntax element vps_num_dpb_params may indicate the number of dpb_parameters( )syntax structures in the VPS. For example, the value of vps_num_dpb_params may be in the range of 0 to 16. Also, when the syntax element vps_num_dpb_params does not exist, the value of the syntax element vps_num_dpb_params may be inferred to be equal to 0.

Also, for example, the syntax element same_dpb_size_output_or_nonoutput_flag may indicate whether the syntax element layer_nonoutput_dpb_params idx[i] may exist in the VPS. For example, when the value of the syntax element same_dpb_size_output_or_nonoutput_flag is 1, the syntax element same_dpb_size_output_or_nonoutput_flag may indicate that there is no syntax element layer_nonoutput_dpb_params_idx[i] in the VPS. when the value of the syntax element same_dpb_size_output_or_nonoutput_flag is 0, the syntax element same_dpb_size_output_or_nonoutput_flag may indicate that the syntax element layer_nonoutput_dpb_params_idx[i] may exist in the VPS.

Also, for example, the syntax element vps_sublayer_dpb_params_present_flag may be used to control the presence of syntax elements max_dec_pic_buffering_minus1[ ], max_num_reorder_pics[ ] and max_latency_increase_plus1[ ] in the dpb_parameters( ) syntax structure of the VPS. Also, when the syntax element vps_sublayer_dpb_params_present_flag does not exist, the value of the syntax element vps_sublayer_dpb_params_present_flag may be inferred to be equal to 0.

Also, for example, the syntax element dpb_size_only_flag[i] may indicate whether the syntax elements max_num_reorder_pics[ ] and max_latency_increase_plus1[ ] may exist in the i-th dpb_parameters( ) syntax structure of the VPS. For example, when the value of the syntax element dpb_size_only_flag[i] is 1, the syntax element dpb_size_only_flag[i] may indicate that the syntax elements max_num_reorder_pics[ ] and max_latency_increase_plus1[ ] do not exist in the i-th dpb_parameters( ) syntax structure of the VPS. When the value of the syntax element dpb_size_only_flag[i] is 0, the syntax element dpb_size_only_flag[i] may indicate that the syntax elements max_num_reorder_pics[ ] and max_latency_increase_plus1[ ] may exist in the i-th dpb_parameters( ) syntax structure of the VPS.

Also, for example, the syntax element dpb_max_temporal_id[i] may indicate the TemporalId of the highest sublayer representation in which the DPB parameter may exist in the i-th dpb_parameters( ) syntax structure of the VPS. Also, the value of dpb_max_temporal_id[i] may be in the range of 0 to vps_max_sublayers_minus1. Also, for example, when the value of vps_max_sublayers_minus1 is 0, the value of dpb_max_temporal_id[i] may be inferred as 0. Also, for example, when the value of vps_max_sublayers_minus1 is greater than 0 and vps_all_layers_same_num_sublayers_flag is 1, the value of dpb_max_temporal_id[i] may be inferred to be equal to vps_max_sublayers_minus1.

Also, for example, the syntax element layer_output_dpb_params_idx[i] may designate the index of the dpb_parameters( ) syntax structure applied to the i-th layer, which is the output layer of the OLS, to the list of dpb_parameters ( ) syntax structure of the VPS. When the syntax element layer_output_dpb_params_idx[i] exists, the value of the syntax element layer_output_dpb_params_idx[i] may be in the range of 0 to vps_num_dpb_params−1.

For example, when vps_independent_layer_flag[i] is 1, it may be a dpb_parameters( ) syntax structure in the SPS referenced by the layer of the dpb_parameters( ) syntax structure applied to the i-th layer, which is an output layer.

Alternatively, for example, when vps_independent_layer_ flag[i] is 0, the following content may be applied.

When vps_num_dpb_params is 1, the value of layer_output_dpb_params_idx[i] may be inferred as 0.

It may be a requirement of bitstream conformance that the value of layer_output_dpb_params_idx[i] causes the value of dpb_size_only_flag[layer_output_dpb_params_idx[i] ] to be 0.

Also, for example, the syntax element layer_nonoutput_dpb_params_idx[i] may designate the index of the dpb_parameters( ) syntax structure applied to the i-th layer, which is a non-output layer of the OLS, to the list of the dpb_parameters( ) syntax structure of the VPS. When the syntax element layer_nonoutput_dpb_params_idx[i] exists, the value of the syntax element layer_nonoutput_dpb_params_idx[i] may be in the range of 0 to vps_num_dpb_params−1.

For example, when same_dpb_size_output_or_nonoutput_flag is 1, the following content may be applied.

When vps_independent_layer_flag[i] is 1, it may be a dpb_parameters( ) syntax structure in the SPS referenced by the layer of the dpb_parameters( ) syntax structure applied to the i-th layer, which is a non-output layer.

When vps_independent_layer_flag[i] is 0, the value of layer_nonoutput_dpb_params_idx[i] may be inferred to be equal to layer_output_dpb_params_idx[i].

Alternatively, for example, when same_dpb_size_output_or_nonoutput_flag is 0, if vps_num_dpb_params is 1, the value of layer_output_dpb_params_idx[i] may be inferred as 0.

Meanwhile, for example, the dpb_parameters( ) syntax structure may be the same as the following syntax and semantic.

TABLE 14

| | Descriptor |
|---|---|
| dpb_parameters( dpbSizeOnlyFlag, maxSubLayersMinus1, subLayerInfoFlag ) { | |
|   for( i = ( subLayerInfoFlag ? 0 : maxSubLayersMinus1 ); | |
|     i <= maxSubLayersMinus1; i++ ) { | |
|     max_dec_pic_buffering_minus1[ i ] | ue(v) |
|     if( !dpbSizeOnlyFlag ) { | |
|       max_num_reorder_pics[ i ] | ue(v) |
|       max_latency_increase_plus1[ i ] | ue(v) |
|     } | |
|   } | |
| } | |

Referring to Table 14, the dpb_parameters( ) syntax structure may provide information on the DPB size for each CLVS of the CVS, the maximum picture reorder number, and the maximum latency. The dpb_parameters( ) syntax structure may be indicated as information on DPB parameters or DPB parameter information.

When the VPS includes the dpb_parameters( ) syntax structure, the OLS to which the dpb_parameters( ) syntax structure is applied may be specified by the VPS. In addition, when the dpb_parameters( ) syntax structure is included in the SPS, the dpb_parameters( ) syntax structure may be applied to an OLS including only the lowest layer among the layers referring to the SPS, wherein the lowest layer may be an independent layer.

Semantics for the syntax elements shown in Table 14 described above may be as follows.

TABLE 15 max_dec_pic_buffering_minus1[ i ] plus 1 specifies, for each for each CLVS of the CVS, the maximum required size of the DPB in units of picture storage buffers when Htid is equal to i. The value of max_dec_pic_buffering_minus1[ i ] shall be in the range of 0 to MaxDpbSize − 1, inclusive, where MaxDpbSize is as specified in clause A.4.2. When i is greater than 0, max_dec_pic_buffering_minus1[ i ] shall be greater than or equal to max_dec_pic_buffering_minus1[ i − 1 ]. When max_dec_pic_buffering_minus1[ i ] is not present for i in the range of 0 to maxSubLayersMinus1 − 1, inclusive, due to subLayerInfoFlag being equal to 0, it is inferred to be equal to max_dec_pic_buffering_minus1[ maxSubLayersMinus1 ].
max_num_reorder_pics[ i ] specifies, for each CLVS of the CVS, the maximum allowed number of pictures of the CLVS that can precede any picture in the CLVS in decoding order and follow that picture in output order when Htid is equal to i. The value of max_num_reorder_pics[ i ] shall be in the range of 0 to max_dec_pic_buffering_minus1[ i ], inclusive. When i is greater than 0, max_num_reorder_pics[ i ] shall be greater than or equal to max_num_reorder_pics[ i − 1 ]. When max_num_reorder_pics[ i ] is not present for i in the range of 0 to maxSubLayersMinus1 − 1, inclusive, due to subLayerInfoFlag being equal to 0, it is inferred to be equal to max_num_reorder_pics[ maxSubLayersMinus1 ].

TABLE 15-continued max_latency_increase_plus1[ i ] not equal to 0 is used to compute the value of
MaxLatencyPictures[ i ], which specifies, for each CLVS of the CVS, the maximum number
of pictures in the CLVS that can precede any picture in the CLVS in output order and follow
that picture in decoding order when Htid is equal to i.
When max_latency_increase_plus1[ i ] is not equal to 0, the value of MaxLatencyPictures[ i ]
is specified as follows:
    MaxLatencyPictures[ i ] =
        max_num_reorder_pics[ i ] + max_latency_increase_plus1[ i ] − 1   (7-73)
When max_latency_increase_plus1[ i ] is equal to 0, no corresponding limit is expressed.
The value of max_latency_increase_plus1[ i ] shall be in the range of 0 to $2^{32} - 2$, inclusive.
When max_latency_increase_plus1[ i ] is not present for i in the range of 0 to
maxSubLayersMinus1 − 1, inclusive, due to subLayerInfoFlag being equal to 0, it is inferred
to be equal to max_latency_increase_plus1[ maxSubLayersMinus1 ].

For example, a value obtained by adding 1 to the syntax element max_dec_pic_buffering_minus1[i] may indicate the maximum required size of the DPB in units of picture storage buffers when Htid is equal to i for each CLVS of CVS. For example, max_dec_pic_buffering_minus1[i] may be information on the DPB size. For example, the value of the syntax element max_dec_pic_buffering_minus1[i] may be in the range of 0 to MaxDpbSize−1. Also, for example, when i is greater than 0, max_dec_pic_buffering_minus1[i] may be greater than or equal to max_dec_pic_buffering_minus1[i−1]. Also, for example, when max_dec_pic_buffering_minus1[i] for i in the range of 0 to maxSubLayersMinus1−1 does not exist, the value of the syntax element max_dec_pic_buffering_minus1[i] may be inferred to be equal to max_dec_pic_buffering_minus1[maxSubLayersMinus1] since subLayerInfoFlag is 0.

Also, for example, the syntax element max_num_reorder_pics[i] may indicate, for each CLVS of CVS, the maximum allowed number of pictures of CLVS that can precede all pictures of CLVS in decoding order and can follow the picture in output order when Htid is equal to i. For example, max_num_reorder_pics[i] may be information on the maximum picture reorder number of the DPB. The value of max_num_reorder_pics[i] may be in the range of 0 to max_dec_pic_buffering_minus1[i]. Also, for example, when i is greater than 0, max_num_reorder_pics[i] may be greater than or equal to max_num_reorder_pics[i−1]. Also, for example, when max_num_reorder_pics[i] for i in the range of 0 to maxSubLayersMinus1−1 does not exist, the syntax element max_num_reorder_pics[i] may be inferred to be equal to max_num_reorder_pics[maxSubLayersMinus1] since subLayerInfoFlag is 0.

Also, for example, a syntax element max_latency_increase_plus1[i] having a non-zero value may be used to calculate the value of MaxLatencyPictures[i]. The MaxLatencyPictures[i] may indicate, for each CLVS of CVS, the maximum number of pictures of CLVS that can precede all pictures of CLVS in decoding order and can follow the picture in output order when Htid is equal to i. For example, max_latency_increaseplus1[i] may be information on the maximum latency of the DPB.

For example, when max_latency_increase_plus1[i] is not 0, the value of MaxLatencyPictures[i] may be derived as follows.

$$\text{MaxLatencyPictures}[i]=\text{max\_num\_reorder\_pics}[i]+\text{max\_latency\_increase\_plus1}[i]-1 \quad\quad [\text{Equation 2}]$$

On the other hand, for example, if max_latency_increase_plus1[i] is 0, the corresponding limit may not be represented. The value of max_latency_increase_plus1[i] may be in the range of 0 to 232-2. Also, for example, when max_latency_increase_plus1[i] for i in the range of 0 to maxSubLayersMinus1−1 does not exist, since subLayerInfoFlag is 0, the syntax element max_latency_increase_plus1[i] may be inferred to be equal to max_latency_increase_plus1[maxSubLayersMinus1].

Meanwhile, the DPB parameter may be used for output and removal of the picture process as shown in the following table.

TABLE 16

The DPB parameter is used in the output and removal of picture process as follows:
The output and removal of (decoded) pictures from the DPB before the decoding of the
current picture (but after parsing the slice header of the first slice of the current picture)
happens instantaneously when the first DU of the AU containing the current picture is
removed from the CPB and proceeds as follows:
- The decoding process for reference picture list construction as specified in clause 8.3.2
  and decoding process for reference picture marking as specified in clause 8.3.3 are
  invoked.
- If the current picture is a CLVSS picture that is not picture 0, the following ordered steps
  are applied:
  1. The variable NoOutputOfPriorPicsFlag is derived for the decoder under test as
     follows:
     - If the value of pic_width_max_in_luma_samples,
       pic_height_max_in_luma_samples, chroma_format_idc,
       separate_colour_plane_flag, bit_depth_minus8, or
       max_dec_pic_buffering_minus1[ Htid ] derived for any picture of the current
       AU is different from the value of pic_width_max_in_luma_samples,
       pic_height_max_in_luma_samples, chroma_format_idc,
       separate_colour_plane_flag, bit_depth_minus8, or
       max_dec_pic_buffering_minus1[ Htid ], respectively, for the preceding picture
       in the same CLVS, NoOutputOfPriorPicsFlag may (but should not) be set to 1
       by the decoder under test, regardless of the value of
       no_output_of_prior_pics_flag.

TABLE 16-continued

NOTE - Although setting NoOutputOfPriorPicsFlag equal to no output of prior pics flag is preferred under these conditions, the decoder under test is allowed to set NoOutputOfPriorPicsFlag to 1 in this case.
- Otherwise, NoOutputOfPriorPicsFlag is set equal to no_output_of_prior_pics_flag.

2. The value of NoOutputOfPriorPicsFlag derived for the decoder under test is applied for the HRD as follows:
- If NoOutputOfPriorPicsFlag is equal to 1, all picture storage buffers in the DPB are emptied without output of the pictures they contain and the DPB fullness is set equal to 0.
- Otherwise (NoOutputOfPriorPicsFlag is equal to 0), all picture storage buffers containing a picture that is marked as "not needed for output" and "unused for reference" are emptied (without output) and all non-empty picture storage buffers in the DPB are emptied by repeatedly invoking the "bumping" process specified in clause C.5.2.4 and the DPB fullness is set equal to 0.

- Otherwise (the current picture is not a CLVSS picture), all picture storage buffers containing a picture which are marked as "not needed for output" and "unused for reference" are emptied (without output). For each picture storage buffer that is emptied, the DPB fullness is decremented by one. When one or more of the following conditions are true, the "bumping" process specified in clause C.5.2.4 is invoked repeatedly while further decrementing the DPB fullness by one for each additional picture storage buffer that is emptied, until none of the following conditions are true:
- The number of pictures in the DPB that are marked as "needed for output" is greater than max_num_reorder_pics[ Htid ].
- max_latency_increase_plus1[ Htid ] is not equal to 0 and there is at least one picture in the DPB that is marked as "needed for output" for which the associated variable PicLatencyCount is greater than or equal to MaxLatencyPictures[ Htid ].
- The number of pictures in the DPB is greater than or equal to max_dec_pic_buffering_minus1[ Htid ] + 1.

Meanwhile, information on Profile, tier, and level (PTL) may be signaled in at least one of DPS, VPS, and/or SPS.

The information on the PTL may be signaled for each OLS.

TABLE 17

| | Descriptor |
|---|---|
| profile_tier_level( profileTierPresentFlag, maxNumSubLayersMinus1 ) { | |
|   if( profileTierPresentFlag ) { | |
|     general_profile_idc | u(7) |
|     general_tier_flag | u(1) |
|     general_constraint_info( ) | |
|   } | |
|   general_level_idc | u(8) |
|   if( profileTierPresentFlag ) { | |
|     num_sub_profiles | u(8) |
|     for( i = 0; i < num_sub_profiles; i++ ) | |
|       general_sub_profile_idc[ i ] | u(32) |
|   } | |
|   for( i = 0; i < maxNumSubLayersMinus 1; i++ ) | |
|     sublayer_level_present_flag[ i ] | u(1) |
|   while( !byte_aligned( ) ) | |
|     ptl_alignment_zero_bit | f(1) |
|   for( i = 0; i < maxNumSubLayersMinus1; i++ ) | |

TABLE 17-continued

| | Descriptor |
|---|---|
|     if( sublayer_level_present_flag[ i ] ) | |
|       sublayer_level_idc[ i ] | u(8) |
| } | |

Referring to Table 17, information on PTL, that is, profile_tier_level( ) syntax structure may include syntax elements of general_profile_idc, general_tier_flag, general_level_idc, num_sub_profiles, general_sub_profile_idc[i], sublayer_level_present_flag[i], ptl_alignment_zero_bits and/or sublayer_level_idc[i].

Information on the PTL, that is, the profile_tier_level( ) syntax structure may provide level information and optionally profile, tier, sub-profile and general constraints information.

For example, when the profile_tier_level( ) syntax structure is included in the VPS, OlsInScope may be one or more OLSs designated by the VPS. Also, for example, when the profile_tier_level( ) syntax structure is included in the SPS, OlsInScope may be an OLS including only the lowest layer among the layers referring to the SPS, and the lowest layer may be an independent layer.

Semantics for the syntax elements shown in Table 17 above may be as follows.

TABLE 18 general_profile_idc indicates a profile to which OlsInScope conforms as specified in Annex A. Bitstreams shall not contain values of general_profile_idc other than those specified in Annex A. Other values of general_profile_idc are reserved for future use by ITU-T | ISO/IEC.
general_tier_flag specifies the tier context for the interpretation of general_level_idc as specified in Annex A.
general_level_idc indicates a level to which OlsInScope conforms as specified in Annex A. Bitstreams shall not contain values of general_level_idc other than those specified in Annex A. Other values of general_level_idc are reserved for future use by ITU-T | ISO/IEC.
NOTE 1 - A greater value of general_level_idc indicates a higher level. The maximum level signalled in the DCI NAL unit for OlsInScope may be higher than but cannot be lower than the level signalled in the SPS for a CLVS contained within OlsInScope.

TABLE 18-continued

NOTE 2 - When OlsInScope conforms to multiple profiles, general_profile_idc should indicate the profile that provides the preferred decoded result or the preferred bitstream identification, as determined by the encoder (in a manner not specified in this Specification).
NOTE 3 - When the CVSs of OlsInScope conform to different profiles, multiple profile_tier_level( ) syntax structures may be included in the DCI NAL unit such that for each CVS of the OlsInScope there is at least one set of indicated profile, tier, and level for a decoder that is capable of decoding the CVS.
num_sub_profiles specifies the number of the general_sub_profile_idc[ i ] syntac elements.
general_sub_profile_idc[ i ] indicates the i-th interoperability metadata registered as specified by Rec. ITU-T T.35, the contents of which are not specified in this Specification.
sublayer_level_present_flag[ i ] equal to 1 specifies that level information is present in the profile_tier_level( ) syntax structure for the sublayer representation with TemporalId equal to i. sublayer_level_present_flag[ i ] equal to 0 specifies that level information is not present in the profile_tier_level( ) syntax structure for the sublayer representation with TemporalId equal to i.
ptl_alignment_zero_bits shall be equal to 0.
The semantics of the syntax element sublayer_level_idc[ i ] is, apart from the specification of the inference of not present values, the same as the syntax element general_level_idc, but apply to the sublayer representation with TemporalId equal to i.
When not present, the value of sublayer_level_idc[ i ] is inferred as follows:
- sublayer_level_idc[ maxNumSubLayersMinus1 ] is inferred to be equal to general_level_idc of the same profile_tier_level( ) structure.
- For i from maxNumSubLayersMinus1 − 1 to 0 (in decreasing order of values of i), inclusive, sublayer_level_idc[ i ] is inferred to be equal to sublayer_level_idc[ i + 1 ].

For example, the syntax element general_profile_idc may indicate a profile that OlsInScope conforms to as disclosed in Annex A. The bitstream may not include a value of general_profile_idc other than those disclosed in Annex A. Other values of general_profile_idc may be reserved for future use by ITU-T|ISO/IEC.

Also, for example, the syntax element general_tier_flag may indicate a tier context for interpretation of general_level_idc disclosed in Annex A.

Also, for example, the syntax element general_level_idc may indicate a level that OlsInScope conforms to as disclosed in Annex A. The bitstream may not include a value of general_level_idc other than those disclosed in Annex A. Other values of general_level_idc may be reserved for future use by ITU-T|ISO/IEC.

Also, for example, the syntax element num_sub_profiles may indicate the number of syntax elements general_sub_profile_idc[i].

Also, for example, the syntax element general_sub_profile_idc[i] may indicate the registered i-th interoperability metadata as disclosed in Rec. ITU-T T.35.

Also, for example, the syntax element sublayer_level_present_flag[i] may indicate whether level information exists in the profile_tier_level( ) syntax structure for a sublayer representation with TemporalId equal to i. For example, sublayer_level_present_flag[i] equal to 1 may indicate that level information exists in the profile_tier_level ( ) syntax structure for a sublayer representation with TemporalId equal to i, and sublayer_level_present flag[i] equal to 0 may indicate that level information does not exist in the profile_tier_level( ) syntax structure for a sublayer representation with TemporalId equal to i.

Also, for example, the syntax element ptl_alignment_zero_bits may be equal to 0.

Also, for example, the syntax element sublayer_level_idc [i] may be applied to a sublayer representation with TemporalId equal to i, although it is the same as the syntax element general_level_idc described above. When the syntax element sublayer_level_idc[i] does not exist, the value of the syntax element sublayer_level_idc[i] may be inferred as follows:

sublayer_level_idc[maxNumSubLayersMinus1] may be inferred to be equal to general_level_idc of the same profile_tier_level( ) structure.

For i from maxNumSubLayersMinus1−1 to 0 (descending order of i values), sublayer_level_idc[i] may be inferred to be equal to sublayer_level_idc[i+1].

Meanwhile, in the case of signaling of PTL, DPB, and HRD structures and mapping to OLS, signaling according to the current video coding standard may have at least the following problems.

First, since both u(8) and ue(v) are used to signal a syntax element of the number of structures (e.g., PTL structure, DPB structure, etc.), the coded parsing process may not be the same.

Second, for signaling of mapping between a syntax structure and an OLS, a mapping-related syntax element may be coded differently. For example, according to the current video coding standard, a syntax element for mapping between PTL syntax structure and OLS may be coded as u(8). A syntax element for mapping between HRD syntax structure and OLS and a syntax element for mapping between DPB syntax structure and OLS may be coded as ue(v).

Accordingly, the present disclosure proposes a solution to the above-described problem. The proposed embodiments may be applied individually or in combination.

As an example, a syntax element (i.e., num_ols_hrd_params_minus1) indicating the number of HRD parameters for OLS may be coded as u(v) in which the number of bits varies according to the value of the number of OLS. That is, the present embodiment proposes a method of coding a syntax element indicating the number of HRD parameters for OLS as u(v) of the number of bits according to the value of the number of OLS. In this case, the number of bits for coding the syntax element may be derived as Ceil (Log2 (Total number of OLS)).

Also, as an example, a syntax element (i.e., num_ols_hrd_params_minus1) indicating the number of HRD parameters for OLS may be coded as ue(v). That is, the present embodiment proposes a method of coding a syntax element indicating the number of HRD parameters for OLS as ue(v).

Also, as an example, a syntax element (i.e., vps_num_dpb_params) indicating the number of DPB parameters for OLS may be coded as u(v) in which the number of bits varies according to the value of the number of OLS. That is, the present embodiment proposes a method of coding a syntax element indicating the number of DPB parameters for OLS as u(v) of the number of bits according to the value of the number of OLS. In this case, the number of bits for coding the syntax element may be derived as Ceil (Log2(Total number of OLS)).

Also, as an example, a syntax element (i.e., vps_num_dpb_params) indicating the number of DPB parameters for OLS may be coded as ue(v). That is, the present embodiment proposes a method of coding a syntax element indicating the number of DPB parameters for OLS as ue(v).

Also, as an example, a syntax element (i.e., vps_num_ptls_minus1) indicating the number of PTL parameters for OLS may be coded as u(v) in which the number of bits varies according to the value of the number of OLS. That is, the present embodiment proposes a method of coding a syntax element indicating the number of PTL parameters for OLS as u(v) of the number of bits according to the value of the number of OLS. In this case, the number of bits for coding the syntax element may be derived as Ceil (Log2 (Total number of OLS)).

Also, as an example, a syntax element (i.e., vps_num_ptls_minus1) indicating the number of PTL parameters for OLS may be coded as ue(v). That is, the present embodiment proposes a method of coding a syntax element indicating the number of PTL parameters for OLS as ue(v).

Also, as an example, the syntax element (i.e., ols_hrd_idx[i]) indicating the mapping between the HRD parameter structure and the OLS may be coded as u(v) in which the number of bits varies according to the number of HRD parameter structures in the VPS. That is, the present embodiment proposes a method of coding the syntax element indicating the mapping between the HRD parameter structure and the OLS as u(v) of the number of bits according to the number of HRD parameter structures in the VPS. In this case, the number of bits for coding the syntax element may be derived as Ceil(Log2(num_ols_hrd_params_minus1+1)).

Also, as an example, a syntax element (i.e., ols_hrd_idx[i]) indicating the mapping between the HRD parameter structure and the OLS may be coded as ue(v). That is, the present embodiment proposes a method of coding a syntax element indicating the mapping between the HRD parameter structure and the OLS as ue(v).

Also, as an example, the syntax element (i.e., ols_dpb_params_idx[i]) indicating the mapping between the DPB parameter structure and the OLS may be coded as u(v) in which the number of bits varies according to the number of DPB parameter structures in the VPS. That is, the present embodiment proposes a method of coding the syntax element indicating the mapping between the DPB parameter structure and the OLS as u(v) of the number of bits according to the number of DPB parameter structures in the VPS. In this case, the number of bits for coding the syntax element may be derived as Ceil(Log2(vps_num_dpb_params)).

Also, as an example, a syntax element (i.e., ols_dpb_params_idx[i]) indicating the mapping between the DPB parameter structure and the OLS may be coded as ue(v). That is, the present embodiment proposes a method of coding a syntax element indicating the mapping between the DPB parameter structure and the OLS as ue(v).

Also, as an example, a syntax element (i.e., ols_ptl_idx[i]) indicating the mapping between the PTL parameter structure and the OLS may be coded as u(v) in which the number of bits varies according to the number of PTL parameter structures in the VPS. That is, the present embodiment proposes a method of coding the syntax element indicating the mapping between the PTL parameter structure and the OLS as u(v) of the number of bits according to the number of PTL parameter structures in the VPS. In this case, the number of bits for coding the syntax element may be derived as Ceil(Log2(vps_num_ptls_minus1+1)).

Also, as an example, a syntax element (i.e., ols_ptl_idx[i]) indicating the mapping between the PTL parameter structure and the OLS may be coded as ue(v). That is, the present embodiment proposes a method of coding a syntax element indicating the mapping between the PTL parameter structure and the OLS as ue(v).

For example, the above-described embodiments may be applied as described below. The encoding apparatus may derive the PTL parameter, the HRD parameter, and the DPB parameter, and may encode the picture(s) based on at least one of the PTL parameter, the HRD parameter, and/or the DPB parameter. The encoding apparatus may encode video/image information including information on the PTL parameter, information on the HRD parameter, and information on the DPB parameter to output a bitstream. The encoding process of the information on the PTL parameter, the information on the HRD parameter, and/or the information on the DPB parameter may be performed based on the embodiment proposed in the present disclosure. Also, the decoding apparatus may derive video/image information from the bitstream. The video/image information may include information on the PTL parameter, information on the HRD parameter, and information on the DPB parameter. The decoding apparatus may decode the picture(s) based on at least one of the information on the PTL parameter, the information on the HRD parameter, and/or the information on the DPB parameter. Specifically, the decoding apparatus may manage the DPB based on at least one of the information on the PTL parameter, the information on the HRD parameter, and/or the information on the DPB parameter. The decoding apparatus may decode or output the picture(s) based on the DPB.

In an embodiment, the signaled video parameter set (VPS) syntax may be as follows.

TABLE 19

| | Descriptor |
|---|---|
| video_parameter_set_rbsp( ) { | |
| ... | |
| vps_num_ptls_minus1 | ~~u(8)~~ u(v) |
| ... | |
| for( i = 0; i <= vps_num_ptls_minus1; i++ ) | |
|   profile_tier_level( pt_present_flag[ i ], | |
|   ptl_max_temporal_id[ i ] ) | |
| for( i = 0; i < TotalNumOlss; i++ ) | |
|   if( vps_num_ptls_minus1 > 0 ) | |
|     ols_ptl_idx[ i ] | ~~u(8)~~ u(v) |
| if( !vps_all_independent_layers_flag ) | |
|   vps_num_dpb_params | ~~ue(v)~~ u(v) |
| ... | |
| for( i = 0; i < TotalNumOlss; i++ ) { | |
|   if( NumLayersInOls[ i ] > 1 ) { | |
|     ols_dpb_pic_width[ i ] | ue(v) |
|     ols_dpb_pic_height[ i ] | ue(v) |
|     if( vps_num_dpb_params > 1 ) | |
|       ols_dpb_params_idx[ i ] | ~~ue(v)~~ u(v) |
|   } | |
| } | |
| ... | |
| if( vps_general_hrd_params_present_flag ) { | |
|   ... | |
|   num_ols_hrd_params_minus1 | ~~ue(v)~~ u(v) |
|   ... | |
|   if( num_ols_hrd_params_minus1 + 1 != TotalNumOlss && | |
|     num_ols_hrd_params_minus1 > 0 ) | |
|     for( i = 1; i < TotalNumOlss; i++ ) | |

TABLE 19-continued

| | Descriptor |
|---|---|
|     if( NumLayersInOls[ i ] > 1 )<br>        ols_hrd_idx[ i ]<br>   }<br>  ...<br>} | ~~ue(v)~~ u(v) |

Referring to Table 19, the VPS may include syntax elements of vps_num_ptls_minus1, ols_ptl_idx[i], vps_num_dpb_params, ols_dpb_params_idx[i], num_ols_hrd_params_minus1, and/or ols_hrd_idx[i]. For example, referring to Table 19, vps_num_ptls_minus1, ols_ptl_idx[i], vps_num_dpb_params, ols_dpb_params_idx[i], num_ols_hrd_params_minus1 and ols_hrd_idx[i] may be coded as u(v).

For example, a value obtained by adding 1 to the syntax element vps_num_ptls_minus1 may indicate the number of profile_tier_level( ) syntax structures in the VPS. Here, the length of the syntax element vps_num_ptls_minus1 (i.e., the number of bits of the syntax element vps_num_ptls_minus1) may be Ceil(Log2(TotalNumOlss)).

Also, for example, the syntax element ols_ptl_idx[i] may indicate an index of a profile_tier_level( ) syntax structure applied to the i-th OLS. The index may be an index of the profile_tier_level( ) syntax structure list of the VPS. That is, the syntax element ols_ptl_idx[i] may indicate an index of the profile_tier_level( ) syntax structure applied to the i-th OLS among a plurality of profile_tier_level( ) syntax structures of the VPS. Here, when the syntax element ols_ptl_idx[i] exists, the value of ols_ptl_idx[i] may be in the range of 0 to vps_num_ptls_minus1. When the value of vps_num_ptls_minus1 is 0, the value of the syntax element ols_ptl_idx[i] may be inferred to be equal to 0. Here, the length of the syntax element ols_ptl_idx[i] (i.e., the number of bits of the syntax element ols_ptl_idx[i]) may be Ceil(Log2(vps_num_ptls_minus1+1)).

When NumLayersInOls[i] is 1, the profile_tier_level( ) syntax structure applied to the i-th OLS may exist in the SPS referenced by the layer of the i-th OLS. When NumLayersInOls[i] is 1, it may be a requirement of bitstream conformance that the profile_tier_level( ) syntax structure signaled in the VPS and the SPS for the i-th OLS should be the same.

Also, for example, the syntax element vps_num_dpb_params may indicate the number of dpb_parameters( ) syntax structures in the VPS. Here, when the syntax element vps_num_dpb_params does not exist, the value of the syntax element vps_num_dpb_params may be inferred to be equal to 0. Here, the length of the syntax element vps_num_dpb_params (i.e., the number of bits of the syntax element vps_num_dpb_params) may be Ceil(Log2(TotalNumOlss)).

Also, for example, the syntax element ols_dpb_params_idx[i] may indicate an index of the dpb_parameters( ) syntax structure applied to the i-th OLS when NumLayersInOls[i] is greater than 1. The index may be an index of the dpb_parameters( ) syntax structure list of the VPS. That is, the syntax element ols_dpb_params_idx[i] may indicate an index of the dpb_parameters( ) syntax structure applied to the i-th OLS among a plurality of dpb_parameters( ) syntax structures of the VPS. Here, when the syntax element ols_dpb_params_idx[i] does not exist, the value of the syntax element ols_dpb_params_idx[i] may be inferred to be equal to 0. Here, the length of the syntax element ols_dpb_params_idx[i] (i.e., the number of bits of the syntax element ols_dpb_params_idx[i]) may be Ceil(Log2(vps_num_dpb_params)). When NumLayersInOls[i] is 1, the dpb_parameters( ) syntax structure applied to the i-th OLS may exist in the SPS referenced by the layer of the i-th OLS.

Also, for example, a value obtained by adding 1 to the syntax element num_ols_hrd_params_minus1 may indicate the number of ols_hrd_parameters( ) syntax structures in the VPS. Here, the length of the syntax element num_ols_hrd_params_minus1 (i.e., the number of bits of the syntax element num_ols_hrd_params_minus1) may be Ceil(Log2(TotalNumOlss)).

Also, for example, when NumLayersInOls[i] is greater than 1, the syntax element ols_hrd_idx[i] may indicate an index of the ols_hrd_parameters( ) syntax structure applied to the i-th OLS. The index may be an index of the ols_hrd_parameters( ) syntax structure list of the VPS. That is, the syntax element ols_hrd_idx[i] may indicate an index of the ols_hrd_parameters( ) syntax structure applied to the i-th OLS among a plurality of ols_hrd_parameters( ) syntax structures of the VPS. Here, the length of the syntax element ols_hrd_idx[i] (i.e., the number of bits of the syntax element ols_hrd_idx[i]) may be Ceil(Log2(num_ols_hrd_params_minus1+1)).

When NumLayersInOls[i] is 1, the ols_hrd_parameters( ) syntax structure applied to the i-th OLS may exist in the SPS referenced by the layer of the i-th OLS.

When the value of num_ols_hrd_param_minus1+1 is equal to TotalNumOlss, the value of ols_hrd_idx[i] may be inferred to be equal to i. Otherwise, that is, when NumLayersInOls[i] is greater than 1 and num_ols_hrd_params_minus1 is 0, the value of ols_hrd_idx[i] may be inferred to be equal to 0.

Alternatively, as an embodiment, the signaled video parameter set (VPS) syntax may be as follows.

TABLE 20

| | Descriptor |
|---|---|
| video_parameter_set_rbsp( ) {<br>  ...<br>  vps_num_ptls_minus1<br>  ...<br>  for( i = 0; i <= vps_num_ptls_minus1; i++ )<br>    profile_tier_level( pt_present_flag[ i ],<br>    ptl_max_temporal_id[ i ] )<br>  for( i = 0; i < TotalNumOlss; i++ )<br>    if( vps_num_ptls_minus1 > 0 )<br>      ols_ptl_idx[ i ]<br>  if( !vps_all_independent_layers_flag )<br>    vps_num_dpb_params<br>  ...<br>  for( i = 0; i < TotalNumOlss; i++ ) {<br>    if( NumLayersInOls[ i ] > 1 ) {<br>      ols_dpb_pic_width[ i ]<br>      ols_dpb_pic_height[ i ]<br>      if( vps_num_dpb_params > 1 )<br>        ols_dpb_params_idx[ i ]<br>    }<br>  }<br>  ...<br>  if( vps_general_hrd_params_present_flag ) {<br>    ...<br>    num_ols_hrd_params_minus1<br>    ...<br>    if( num_ols_hrd_params_minus1 + 1 !=<br>    TotalNumOlss &&<br>      num_ols_hrd_params_minus1 > 0 )<br>      for( i = 1; i < TotalNumOlss; i++ )<br>        if( NumLayersInOls[ i ] > 1 )<br>          ols_hrd_idx[ i ]<br>    }<br>  ...<br>} | <br><br>~~u(8)~~ ue(v)<br><br><br><br><br><br>~~u(8)~~ u(v)<br><br>ue(v)<br><br><br><br>ue(v)<br>ue(v)<br><br>~~ue(v)~~ u(v)<br><br><br><br><br>ue(v)<br><br><br><br><br><br>~~ue(v)~~ u(v) |

Referring to Table 20, the VPS may include syntax elements of vps_num_ptls_minus1, ols_ptl_idx[i], vps_num_dpb_params, ols_dpb_params_idx[i], num_ols_hrd_params_minus1, and/or ols_hrd_idx[i]. For example, referring to Table 20, ols_ptl_idx[i], ols_dpb_params_idx[i], and ols_hrd_idx[i] may be coded as u(v). vps_num_ptls_minus1, vps_num_dpb_params and num_ols_hrd_params_minus1 may be coded as ue(v). That is, Table 20 proposes a method of coding syntax elements indicating the number of PTL parameter syntax structure/DPB parameter syntax structure/HRD parameter syntax structure as ue(v) and coding syntax elements indicating the index of PTL parameter syntax structure/DPB parameter syntax structure/HRD parameter syntax structure as u(v).

FIG. 7 schematically illustrates an image encoding method by an encoding apparatus according to the present disclosure. The method disclosed in FIG. 7 may be performed by the encoding apparatus disclosed in FIG. 2. Specifically, for example, S700 of FIG. 7 may be performed by the DPB of the encoding apparatus, and S710 to S730 may be performed by the entropy encoder of the encoding apparatus. In addition, although not shown, the process of performing the DPB management process may be performed by the DPB of the encoding apparatus, and the process of decoding the current picture may be performed by the predictor and the residual processor of the encoding apparatus.

The encoding apparatus determines whether a hypothetical reference decoder (HRD) parameter syntax structure for a target output layer set (OLS) exists (S700). For example, the encoding apparatus may determine whether a hypothetical reference decoder (HRD) parameter syntax structure for a target output layer set (OLS) exists. Here, for example, the target OLS may be one of OLSs including a plurality of layers.

For example, when it is determined that the HRD parameter syntax structure exists, the encoding apparatus may derive the HRD parameter for the target OLS. For example, the encoding apparatus may derive the HRD parameter for a DPB management process.

Also, for example, the encoding apparatus may derive a decoded picture buffer (DPB) parameter for the target OLS. For example, the encoding apparatus may derive the DPB parameter for the DPB management process. Also, for example, the encoding apparatus may derive a Profile Tier Level (PTL) parameter for the target OLS. For example, the encoding apparatus may derive the PTL parameter for the DPB management process.

Meanwhile, for example, the encoding apparatus may perform a DPB management process based on the HRD parameter. For example, the encoding apparatus may perform a picture management process for the decoded picture of the DPB based on the HRD parameter. For example, the encoding apparatus may add a decoded picture to the DPB, or may remove a decoded picture in the DPB. For example, the decoded picture in the DPB may be used as a reference picture of inter prediction for the current picture, or the decoded picture in the DPB may be used as an output picture. The decoded picture may mean a picture decoded before the current picture in decoding order in the target OLS.

Also, for example, the encoding apparatus may perform the DPB management process based on the HRD parameter, the DPB parameter, and/or the PTL parameter. For example, the encoding apparatus may perform the picture management process for the decoded picture of the DPB based on the HRD parameter, the DPB parameter, and/or the PTL parameter. For example, the encoding apparatus may add a decoded picture to the DPB, or may remove a decoded picture in the DPB. For example, the decoded picture in the DPB may be used as a reference picture of inter prediction for the current picture, or the decoded picture in the DPB may be used as an output picture. The decoded picture may mean a picture decoded before the current picture in decoding order in the target OLS.

The encoding apparatus generates the HRD parameter syntax structure for the target OLS based on the result of the HRD determination (S710). For example, when it is determined that the HRD parameter syntax structure for the target OLS exists, the encoding apparatus may generate the HRD parameter syntax structure for the target OLS. For example, the encoding apparatus may generate the HRD parameter syntax structure for the target OLS based on the HRD parameter. For example, the image information may include the HRD parameter syntax structure for the target OLS. For example, a Video Parameter Set (VPS) and/or a Sequence Parameter Set (SPS) may include the HRD parameter syntax structure for the target OLS.

For example, the HRD parameter syntax structure may include the syntax element for the HRD parameter for the target OLS. For example, the HRD parameter syntax structure may be as shown in Table 5 above. For example, the syntax elements for the HRD parameter may include the above-described num_units_in_tick, time_scale, general_nal_hrd_params_present_flag, general_vcl_hrd_params_present_flag, general_same_pic_timing_in_all_ols_flag, general_decoding_unit_hrd_params_present_flag, tick_divisor_minus2, bit_rate_scale, cpb_size_scale, cpb_size_du_scale, hrd_cpb_cnt_minus1, fixed_pic_rate_general_flag[i], fixed_pic_rate_within_cvs_flag[i], elemental_duration_in_tc_minus1[i], low_delay_hrd_flag[i], bit_rate_value_minus1[i][j], cpb_size_value_minus1[i][j], cpb_size_du_ value_minus1[i][j], bit_rate_du_value_minus1[i][j], and/or cbr_flag[i][j].

Also, the encoding apparatus may generate the DPB parameter syntax structure for the target OLS based on the DPB parameter. For example, the image information may include the DPB parameter syntax structure for the target OLS. For example, a Video Parameter Set (VPS) may include the DPB parameter syntax structure for the target OLS. The DPB parameter syntax structure may include the syntax element for the DPB parameter for the target OLS. For example, the DPB parameter syntax structure may be as shown in Table 14 above. For example, the syntax elements for the DPB parameter may include the aforementioned vps_num_ptls_minus1, ols_ptl_idx[i], vps_num_dpb_params, ols_dpb_params_idx[i], num_ols_hrd_params_minus1 and/or ols_hrd_idx[i].

Also, the encoding apparatus may generate the PTL parameter syntax structure for the target OLS based on the PTL parameter. For example, the image information may include the PTL parameter syntax structure for the target OLS. For example, a Video Parameter Set (VPS) may include the PTL parameter syntax structure for the target OLS. The PTL parameter syntax structure may include a syntax element for the PTL parameter for the target OLS. For example, the PTL parameter syntax structure may be as shown in Table 17 above. For example, the syntax elements for the DPB parameter may include the aforementioned general_profile_idc, general_tier_flag, general_level_idc, num_sub_profiles, general_sub_profile_idc[i], sublayer_level_present_flag[i], ptl_alignment_zero_bits, and/or sublayer_level_idc[i].

The encoding apparatus generates HRD-related information on whether the HRD parameter syntax structure for the target OLS exists (S720). The encoding apparatus may generate HRD-related information on whether the HRD parameter syntax structure for the target OLS exists.

For example, the HRD-related information may include an OLS HRD existence flag for whether an HRD index of the target OLS exists. For example, the HRD-related information may include an OLS HRD existence flag for whether an HRD index exists with respect to an OLS including a plurality of layers. That is, for example, the OLS HRD existence flag may indicate whether an HRD index exists with respect to an OLS including a plurality of layers. For example, the OLS HRD existence flag may be included in the VPS. That is, for example, the encoding apparatus may signal the OLS HRD existence flag to the VPS.

For example, when the value of the OLS HRD existence flag is 1, the OLS HRD existence flag may indicate that the HRD index for the target OLS exists, and when the value of the OLS HRD existence flag is 0, the OLS HRD existence flag may indicate that the HRD index for the target OLS does not exist. For example, the HRD index may be signaled based on the OLS HRD existence flag having a value of 1. That is, for example, when the value of the OLS HRD existence flag is 1, the HRD-related information may include the HRD index for the target OLS. Also, for example, the HRD parameter syntax structure for the target OLS may be derived based on the HRD index. Alternatively, for example, the HRD parameter syntax structure for the target OLS may not be obtained based on the OLS HRD existence flag having a value of 0. The syntax element of the OLS HRD existence flag may be the above-described ols_hrd_present_flag[i].

For example, the HRD index may be generated and encoded based on the OLS HRD existence flag having a value of 1. That is, for example, when the value of the OLS HRD existence flag is 1, the encoding apparatus may generate and encode the HRD index for the target OLS indicating the HRD parameter syntax structure for the target OLS. The image information may include the VPS. The HRD index for the target OLS may be included in the VPS. That is, for example, the encoding device may signal the HRD index for the target OLS to the VPS.

For example, the HRD index for the target OLS may indicate the HRD parameter syntax structure for the target OLS. For example, the HRD parameter syntax structure may include the syntax element for the HRD parameter of the target OLS, and the HRD index for the target OLS may indicate the HRD parameter syntax structure for the target OLS among HRD parameter syntax structures in the VPS. For example, the index of the HRD parameter syntax structure for the target OLS may be derived as the HRD index. The syntax element of the HRD index may be the above-described ols_hrd_idx[i].

Also, for example, the image information may include HRD parameter syntax structure number information for the number of HRD parameter syntax structures in the VPS. For example, the HRD parameter syntax structure number information may be included in the VPS. That is, for example, the encoding apparatus may signal the HRD parameter syntax structure number information to the VPS. For example, the HRD parameter syntax structure number information may indicate the number of HRD parameter syntax structures in the VPS. The syntax element of the HRD parameter syntax structure number information may be the above-described num_ols_hrd_params_minus1.

Meanwhile, as an example, the HRD index may be coded based on the descriptor u(v). For example, the image information may include the HRD parameter syntax structure number information for the number of HRD parameter syntax structures in the VPS, and the number of bits v used to code the HRD index may be derived based on the HRD parameter syntax structure number information. Specifically, for example, the number of bits v may be derived as Ceil(Log2(num_ols_hrd_params_minus1+1)) or Ceil(Log2(num_ols_hrd_params_minus1+2)). Here, the descriptor u(v) may mean that a syntax element is coded as an unsigned integer using v bits.

Alternatively, as an example, the HRD index may be coded based on the descriptor ue(v). Here, the descriptor ue(v) may mean that a syntax element is coded by an unsigned integer 0-th order exponential Golomb (Exp-Golomb) parsing process.

Also, as an example, the HRD parameter syntax structure number information may be coded based on the descriptor u(v). For example, the number of bits v used to code the HRD parameter syntax structure number information may be derived based on the number of OLSs for the VPS. Specifically, for example, the number of bits v may be derived as Ceil(Log2(TotalNumOlss)). The number of the OLSs may be represented by the above-described variable TotalNumOlss.

Alternatively, as an example, the HRD parameter syntax structure number information may be coded based on the descriptor ue(v).

Also, as an example, the image information may include a VPS general HRD parameter existence flag for whether the VPS includes a general HRD parameter syntax structure. For example, the VPS general HRD parameter existence flag may indicate whether the VPS includes a general HRD parameter syntax structure. For example, when the value of the VPS general HRD parameter existence flag is 1, the VPS general HRD parameter existence flag may indicate that the VPS includes a general HRD parameter syntax structure, and when the value of the VPS general HRD parameter existence flag is 0, the VPS generic HRD parameter existence flag may indicate that the VPS does not include a generic HRD parameter syntax structure. For example, the image information may include a VPS general HRD parameter existence flag for whether the VPS includes a general HRD parameter syntax structure, and when the value of the VPS general HRD parameter existence flag is 1, the value of at least one of the OLS HRD existence flags of the OLSs for the VPS may be 1. The syntax element of the VPS general HRD parameter existence flag may be the above-described vps_general_hrd_params_present_flag.

Alternatively, for example, the HRD-related information may include the HRD index for the target OLS, and the HRD parameter syntax structure for the target OLS may not be signaled based on the HRD index having a value of 0. Alternatively, for example, when the value of the OLS HRD index is not 0, the HRD parameter syntax structure for the target OLS may be derived based on a value obtained by adding 1 to the HRD index. For example, the index of the HRD parameter syntax structure may be derived as a value obtained by adding 1 to the HRD index, and the HRD index having a value of 0 may indicate that there is no HRD parameter for the target OLS. That is, for example, the OLS HRD existence flag is not signaled, and the HRD index having a value of 0 may indicate that there is no HRD parameter for the target OLS. The syntax element of the HRD index may be the above-described ols_hrd_idx_plus1[i]. In this case, for example, the image information may include a VPS general HRD parameter existence flag for whether the VPS includes a general HRD parameter syntax structure, and when the value of the VPS general HRD parameter existence flag is 1, the value of at least one of HRD indices of OLSs for the VPS may not be 0.

Also, for example, the encoding apparatus may generate and encode a DPB index for the target OLS indicating the DPB parameter syntax structure for the target OLS. For example, the image information may include a DPB index for the DPB parameter syntax structure for the target OLS. For example, the DPB index may be included in the VPS. That is, for example, the encoding apparatus may signal the DPB index to the VPS. For example, the DPB index for the target OLS may indicate the DPB parameter syntax structure for the target OLS. For example, the DPB parameter syntax structure may include a syntax element for a DPB parameter of the target OLS, and the DPB index for the target OLS may indicate the DPB parameter syntax structure for the target OLS among DPB parameter syntax structures in the VPS. For example, the index of the DPB parameter syntax structure for the target OLS may be derived as the DPB index. The syntax element of the DPB index may be the above-described ols_dpb_params_idx[i].

Also, for example, the image information may include DPB parameter syntax structure number information for the number of DPB parameter syntax structures in the VPS. For example, the DPB parameter syntax structure number information may be included in the VPS. That is, for example, the encoding apparatus may signal the DPB parameter syntax structure number information to the VPS. For example, the DPB parameter syntax structure number information may indicate the number of DPB parameter syntax structures in the VPS. The syntax element of the DPB parameter syntax structure number information may be the above-described vps_num_dpb_params.

Meanwhile, as an example, the DPB index may be coded based on the descriptor u(v). For example, the image information may include the DPB parameter syntax structure number information for the number of DPB parameter syntax structures in the VPS, and the number of bits v used to code the DPB index may be derived based on the DPB parameter syntax structure number information. Specifically, for example, the number of bits v may be derived as Ceil(Log2(vps_num_dpb_params)).

Alternatively, as an example, the DPB index may be coded based on the descriptor ue(v).

Also, as an example, the DPB parameter syntax structure number information may be coded based on the descriptor u(v). For example, the number of bits v used to code the DPB parameter syntax structure number information may be derived based on the number of OLSs for the VPS. Specifically, for example, the number of bits v may be derived as Ceil(Log2(TotalNumOlss)). The number of the OLSs may be represented by the above-described variable TotalNumOlss.

Alternatively, as an example, the DPB parameter syntax structure number information may be coded based on the descriptor ue(v).

Also, for example, the encoding apparatus may generate and encode a PTL index for the target OLS indicating the PTL parameter syntax structure for the target OLS. For example, the image information may include PTL parameter syntax structure number information for the number of PTL (Profile Tier Level) parameter syntax structures in the VPS and/or a PTL index for the PTL parameter syntax structure for the target OLS. For example, the PTL parameter syntax structure number information and/or the PTL index may be included in the VPS. That is, for example, the encoding apparatus may signal the PTL parameter syntax structure number information and/or the PTL index to the VPS. For example, the PTL index for the target OLS may indicate the PTL parameter syntax structure for the target OLS. For example, the PTL parameter syntax structure may include a syntax element for a PTL parameter of the target OLS, and the PTL index for the target OLS may indicate the PTL parameter syntax structure for the target OLS among PTL parameter syntax structures in the VPS. For example, the index of the PTL parameter syntax structure for the target OLS may be derived as the PTL index. The syntax element of the PTL index may be the above-described ols_ptl_idx[i]. Also, for example, the PTL parameter syntax structure number information may indicate the number of PTL parameter syntax structures in the VPS. The syntax element of the PTL parameter syntax structure number information may be the above-described vps_num_ptls_minus1.

Meanwhile, as an example, the PTL index may be coded based on the descriptor u(v). For example, the image information may include the PTL parameter syntax structure number information for the number of PTL parameter syntax structures in the VPS, and the number of bits v used to code the PTL index may be derived based on the PTL parameter syntax structure number information. Specifically, for example, the number of bits v may be derived as Ceil(Log2(vps_num_ptls_minus1+1)).

Alternatively, as an example, the PTL index may be coded based on the descriptor ue(v).

Also, as an example, the PTL parameter syntax structure number information may be coded based on the descriptor u(v). For example, the number of bits v used to code the PTL parameter syntax structure number information may be derived based on the number of OLSs for the VPS. Specifically, for example, the number of bits v may be derived as Ceil(Log2(TotalNumOlss)). The number of the OLSs may be represented by the above-described variable TotalNumOlss.

Alternatively, as an example, the PTL parameter syntax structure number information may be coded based on the descriptor ue(v).

The encoding apparatus encodes the image information including the HRD-related information (S730). The encoding apparatus may encode the HRD-related information. The image information may include the HRD-related information. In addition, the image information may includes the above-described HRD parameter syntax structure, DPB parameter syntax structure, PTL parameter syntax structure, HRD parameter syntax structure number information, OLS HRD existence flag, DPB index, DPB parameter syntax structure number information, PTL index and/or PTL parameter syntax structure number information.

Meanwhile, the encoding apparatus may decode the picture of the target OLS. Also, for example, the encoding apparatus may update the DPB based on the HRD parameter syntax structure, the DPB parameter syntax structure, and/or the PTL parameter syntax structure for the target OLS. For example, the encoding apparatus may perform the DPB management process for the decoded picture of the DPB based on the HRD parameter syntax structure, the DPB parameter syntax structure, and/or the PTL parameter syntax structure. For example, the encoding apparatus may add a decoded picture to the DPB, or may remove a decoded picture in the DPB. For example, the decoded picture in the DPB may be used as a reference picture of inter prediction for the current picture, or the decoded picture in the DPB may be used as an output picture. The decoded picture may mean a picture decoded before the current picture in decoding order in the target OLS.

Also, for example, the encoding apparatus may decode the current picture of the target OLS based on the DPB. For example, the encoding apparatus may derive a prediction sample by performing inter prediction on a block in the current picture based on the reference picture of the DPB, and may generate a reconstructed sample and/or a reconstructed picture for the current picture based on the prediction sample. Meanwhile, for example, the encoding apparatus may derive a residual sample of a block in the current picture, and may generate a reconstructed sample and/or a reconstructed picture through addition of the prediction sample and the residual sample.

Meanwhile, for example, the encoding apparatus may generate and encode prediction information for a block of the current picture. In this case, various prediction methods disclosed in the present disclosure, such as inter prediction or intra prediction, may be applied. For example, the encoding apparatus may determine whether to perform inter prediction or intra prediction on the block, and may determine a specific inter prediction mode or a specific intra prediction mode based on the RD cost. According to the determined mode, the encoding apparatus may derive a prediction sample for the current chroma block. The prediction information may include prediction mode information for the current chroma block. The image information may include the prediction information.

Also, for example, the encoding apparatus may encode residual information for a block of the picture.

For example, the encoding apparatus may derive the residual sample by subtracting the predicted sample from the original sample for the block.

Then, for example, the encoding apparatus may quantize the residual sample to derive a quantized residual sample, and may derive a transform coefficient based on the quantized residual sample, and may generate and encode the residual information based on the transform coefficient. Alternatively, for example, the encoding apparatus may quantize the residual sample to derive a quantized residual sample, may transform the quantized residual sample to derive a transform coefficient, and may generate and encode the residual information based on the transform coefficient. The image information may include the residual information. Also, for example, the encoding apparatus may encode image information to output a bitstream.

The encoding apparatus may generate reconstructed samples and/or a reconstructed picture through addition of the prediction samples and the residual samples. As described above, an in-loop filtering procedure such as deblocking filtering, SAO, and/or ALF procedure may be applied to the reconstructed samples to improve subjective/objective picture quality if necessary.

Meanwhile, the bitstream including the image information may be transmitted to the decoding apparatus through a network or (digital) storage medium. Here, the network may include a broadcasting network and/or a communication network, and the digital storage medium may include various storage media such as USB, SD, CD, DVD, Blu-ray, HDD, SSD, and the like.

FIG. 8 schematically illustrates an encoding apparatus for performing an image encoding method according to the present disclosure. The method disclosed in FIG. 7 may be performed by the encoding apparatus disclosed in FIG. 8. Specifically, for example, the DPB of the encoding apparatus of FIG. 8 may perform S700, and the entropy encoder of the encoding apparatus of FIG. 8 may perform S710 through S730. In addition, although not shown, the process of performing the DPB management process may be performed by the DPB of the encoding apparatus, and the process of decoding the current picture may be performed by the predictor and the residual processor of the encoding apparatus.

FIG. 9 schematically illustrates an image decoding method by a decoding apparatus according to the present disclosure. The method disclosed in FIG. 9 may be performed by the decoding apparatus illustrated in FIG. 3. Specifically, for example, S900 to S920 of FIG. 9 may be performed by the entropy decoder of the decoding apparatus, S930 of FIG. 9 may be performed by the DPB of the decoding apparatus, and S940 of FIG. 9 may be performed by the predictor and the residual processor of the decoding apparatus.

The decoding apparatus obtains image information including HRD (hypothetical reference decoder) related information for a target output layer set (OLS) (S900).

For example, the decoding apparatus may obtain image information including HRD-related information for the target OLS. The decoding apparatus may obtain a video parameter set (VPS) from the bitstream. The image information may include the VPS. The image information may be received from the bitstream. HRD-related information on the target OLS may be included in the VPS. That is, for example, the decoding apparatus may obtain the HRD related information for the target OLS from the VPS. Here, for example, the target OLS may be one of OLSs including a plurality of layers.

For example, the HRD-related information may include an OLS HRD existence flag for whether an HRD index of the target OLS exists. That is, for example, the OLS HRD existence flag may indicate whether an HRD index exists with respect to an OLS including a plurality of layers. For example, the OLS HRD existence flag may be included in the VPS. That is, for example, the decoding apparatus may obtain the OLS HRD existence flag from the VPS.

For example, when the value of the OLS HRD existence flag is 1, the OLS HRD existence flag may indicate that the HRD index for the target OLS exists, and when the value of the OLS HRD existence flag is 0, the OLS HRD existence flag may indicate that the HRD index for the target OLS does not exist. For example, the HRD index may be obtained based on the OLS HRD existence flag having a value of 1. Also, for example, the HRD parameter syntax structure for the target OLS may be derived based on the HRD index. Alternatively, for example, the HRD parameter syntax structure for the target OLS may not be obtained based on the OLS HRD existence flag having a value of 0. The syntax element of the OLS HRD existence flag may be the above-described ols_hrd_present_flag[i].

For example, the HRD index for the target OLS may indicate an HRD parameter syntax structure for the target OLS. For example, the HRD parameter syntax structure may include a syntax element for an HRD parameter of the target OLS, and the HRD index for the target OLS may indicate the HRD parameter syntax structure for the target OLS among HRD parameter syntax structures in the VPS. For example, the index of the HRD parameter syntax structure for the target OLS may be derived as the HRD index. The syntax element of the HRD index may be the above-described ols_hrd_idx[i].

Also, for example, the image information may include HRD parameter syntax structure number information for the number of HRD parameter syntax structures in the VPS. For example, the HRD parameter syntax structure number information may be included in the VPS. That is, for example, the decoding apparatus may obtain the HRD parameter syntax structure number information from the VPS. For example, the HRD parameter syntax structure number information may indicate the number of HRD parameter syntax structures in the VPS. The syntax element of the HRD parameter syntax structure number information may be the above-described num_ols_hrd_params_minus1.

Meanwhile, as an example, the HRD index may be coded based on the descriptor u(v). For example, the image information may include the HRD parameter syntax structure number information for the number of HRD parameter syntax structures in the VPS, and the number of bits v used to code the HRD index may be derived based on the HRD parameter syntax structure number information. Specifically, for example, the number of bits v may be derived as Ceil(Log2(num_ols_hrd_params_minus1+1)) or Ceil(Log2 (num_ols_hrd_params_minus1+2)). Here, the descriptor u(v) may mean that a syntax element is coded as an unsigned integer using v bits.

Alternatively, as an example, the HRD index may be coded based on the descriptor ue(v). Here, the descriptor ue(v) may mean that a syntax element is coded by an unsigned integer 0-th order exponential Golomb (Exp-Golomb) parsing process.

Also, as an example, the HRD parameter syntax structure number information may be coded based on the descriptor u(v). For example, the number of bits v used to code the HRD parameter syntax structure number information may be derived based on the number of OLSs for the VPS. Specifically, for example, the number of bits v may be derived as Ceil(Log2(TotalNumOlss)). The number of the OLSs may be represented by the above-described variable TotalNumOlss.

Alternatively, as an example, the HRD parameter syntax structure number information may be coded based on the descriptor ue(v).

Also, as an example, the image information may include a VPS general HRD parameter existence flag for whether the VPS includes a general HRD parameter syntax structure. For example, the VPS general HRD parameter existence flag may indicate whether the VPS includes a general HRD parameter syntax structure. For example, when the value of the VPS general HRD parameter existence flag is 1, the VPS general HRD parameter existence flag may indicate that the VPS includes a general HRD parameter syntax structure, and when the value of the VPS general HRD parameter existence flag is 0, the VPS general HRD parameter existence flag may indicate that the VPS does not include a general HRD parameter syntax structure. For example, the image information may include a VPS general HRD parameter existence flag for whether the VPS includes a general HRD parameter syntax structure, and when the value of the VPS general HRD parameter existence flag is 1, a value of at least one of OLS HRD existence flags of OLSs for the VPS may be 1. The syntax element of the VPS general HRD parameter existence flag may be the above-described vps_general_hrd_params_present_flag.

Alternatively, for example, the HRD-related information may include an HRD index for the target OLS, and the HRD parameter syntax structure for the target OLS may not be obtained based on the HRD index having a value of 0. Alternatively, for example, when the value of the OLS HRD index is not 0, the HRD parameter syntax structure for the target OLS may be derived based on a value obtained by adding 1 to the HRD index. For example, the index of the HRD parameter syntax structure may be derived as a value obtained by adding 1 to the HRD index, and the HRD index having a value of 0 may indicate that there is no HRD parameter for the target OLS. That is, for example, the OLS HRD existence flag is not signaled, and the HRD index having a value of 0 may indicate that there is no HRD parameter for the target OLS. The syntax element of the HRD index may be the above-described ols_hrd_idx_plus1 [i]. In this case, for example, the image information may include a VPS general HRD parameter existence flag for whether the VPS includes a general HRD parameter syntax structure, and when the value of the VPS general HRD parameter existence flag is 1, a value of at least one of HRD indices of OLSs for the VPS may not be 0.

Also, for example, the image information may include a DPB index for a DPB parameter syntax structure for the target OLS. For example, the DPB index may be included in the VPS. That is, for example, the decoding apparatus may obtain the DPB index from the VPS. For example, the DPB index for the target OLS may indicate a DPB parameter syntax structure for the target OLS. For example, the DPB parameter syntax structure may include a syntax element for a DPB parameter of the target OLS, and the DPB index for the target OLS may indicate DPB parameter syntax structure for the target OLS among DPB parameter syntax structures in the VPS. For example, the index of the DPB parameter syntax structure for the target OLS may be derived as the DPB index. The syntax element of the DPB index may be the above-described ols_dpb_params_idx[i].

Also, for example, the image information may include DPB parameter syntax structure number information for the number of DPB parameter syntax structures in the VPS. For example, the DPB parameter syntax structure number information may be included in the VPS. That is, for example, the decoding apparatus may obtain the DPB parameter syntax structure number information from the VPS. For example, the DPB parameter syntax structure number information may indicate the number of DPB parameter syntax structures in the VPS. The syntax element of the DPB parameter syntax structure number information may be the above-described vps_num_dpb_params.

Meanwhile, as an example, the DPB index may be coded based on the descriptor u(v). For example, the image information may include DPB parameter syntax structure number information for the number of DPB parameter syntax structures in the VPS, and the number of bits v used to code the DPB index may be derived based on the DPB parameter syntax structure number information. Specifically, for example, the number of bits v may be derived as Ceil(Log2 (vps_num_dpb_params)).

Alternatively, as an example, the DPB index may be coded based on the descriptor ue(v).

Also, as an example, the DPB parameter syntax structure number information may be coded based on the descriptor u(v). For example, the number of bits v used to code the DPB parameter syntax structure number information may be derived based on the number of OLSs for the VPS. Specifically, for example, the number of bits v may be derived as Ceil(Log2(TotalNumOlss)). The number of the OLSs may be represented by the above-described variable TotalNumOlss.

Alternatively, as an example, the DPB parameter syntax structure number information may be coded based on the descriptor ue(v).

Also, for example, the image information may include PTL parameter syntax structure number information for the number of PTL (Profile Tier Level) parameter syntax structures in the VPS (Video Parameter Set) and/or a PTL index for the PTL parameter syntax structure for the target OLS. For example, the PTL parameter syntax structure number information and/or the PTL index may be included in the VPS. That is, for example, the decoding apparatus may obtain the PTL parameter syntax structure number information and/or the PTL index from the VPS. For example, the PTL index for the target OLS may indicate the PTL parameter syntax structure for the target OLS. For example, the PTL parameter syntax structure may include a syntax element for a PTL parameter of the target OLS, and the PTL index for the target OLS may indicate the PTL parameter syntax structure for the target OLS among PTL parameter syntax structures in the VPS. For example, the index of the PTL parameter syntax structure for the target OLS may be derived as the PTL index. The syntax element of the PTL index may be the above-described ols_ptl_idx[i]. Also, for example, the PTL parameter syntax structure number information may indicate the number of PTL parameter syntax structures in the VPS. The syntax element of the PTL parameter syntax structure number information may be the above-described vps_num_ptls_minus1.

Meanwhile, as an example, the PTL index may be coded based on the descriptor u(v). For example, the image information may include PTL parameter syntax structure number information for the number of PTL parameter syntax structures in the VPS, and the number of bits v used to code the PTL index may be derived based on the PTL parameter syntax structure number information. Specifically, for example, the number of bits v may be derived as Ceil(Log2 (vps_num_ptls_minus1+1)).

Alternatively, as an example, the PTL index may be coded based on the descriptor ue(v).

Also, as an example, the PTL parameter syntax structure number information may be coded based on the descriptor u(v). For example, the number of bits v used to code the PTL parameter syntax structure number information may be derived based on the number of OLSs for the VPS. Specifically, for example, the number of bits v may be derived as Ceil(Log2(TotalNumOlss)). The number of the OLSs may be represented by the above-described variable TotalNumOlss.

Alternatively, as an example, the PTL parameter syntax structure number information may be coded based on the descriptor ue(v).

The decoding apparatus determines whether an HRD parameter syntax structure for the target OLS exists based on the HRD-related information (S910). For example, the decoding apparatus may determine whether an HRD parameter syntax structure for the target OLS exists based on the HRD-related information.

For example, the HRD-related information may include an OLS HRD existence flag for whether an HRD index of the target OLS exists. It may be determined, based on the OLS HRD existence flag having a value of 0, that the HRD parameter syntax structure for the target OLS does not exist. Based on the OLS HRD existence flag having a value of 1, it may be determined that the HRD parameter syntax structure for the target OLS exists, and the HRD index for the target OLS may be obtained.

Alternatively, for example, the HRD-related information may include an HRD index for the target OLS. Based on the HRD index having a value of 0, it may be determined that the HRD parameter syntax structure for the target OLS does not exist. When a value of the OLS HRD index is not 0, it may be determined that the HRD parameter syntax structure for the target OLS exists.

The decoding apparatus derives the HRD parameter syntax structure for the target OLS based on the result of the determination (S920). The decoding apparatus may derive the HRD parameter syntax structure for the target OLS based on the result of the determination. For example, when it is determined, based on the HRD-related information, that the HRD parameter syntax structure for the target OLS exists, the decoding apparatus may derive the HRD parameter syntax structure for the target OLS based on the HRD index. For example, the decoding apparatus may derive the HRD parameter syntax structure for the target OLS indicated by the HRD index. Or, for example, the decoding apparatus may derive the HRD parameter syntax structure for the target OLS indicated by the value obtained by adding 1 to the HRD index. The HRD parameter syntax structure may include a syntax element for the HRD parameter for the target OLS. For example, the HRD parameter syntax structure may be as shown in Table 5 above. For example, the syntax elements for the HRD parameter may include the above-described num_units_in_tick, time_scale, general_nal_hrd_params_present_flag, general_vcl_hrd_params_present_flag, general_same_pic_timing_in_all_ols_flag, general_decoding_unit_hrd_params_present_flag, tick_divisor_minus2, bit_rate_scale, cpb_size_scale, cpb_size_du_scale, hrd_cpb_cnt_minus1, fixed_pic_rate_general_flag[i], fixed_pic_rate_within_cvs_flag[i], elemental_duration_in_tc_minus1[i], low_delay_hrd_flag[i], bit_rate_value_minus1[i][j], cpb_size_value_minus1[i][j], cpb_size_du_ value_minus1[i][j], bit_rate_du_value_minus1[i][j] and/or cbr_flag[i][j].

Also, the decoding apparatus may derive a DPB parameter syntax structure for the target OLS based on the DPB index. For example, the decoding apparatus may derive the DPB parameter syntax structure for the target OLS indicated by the DPB index. The DPB parameter syntax structure may include a syntax element for the DPB parameter for the target OLS. For example, the DPB parameter syntax structure may be as shown in Table 14 above. For example, the syntax elements for the DPB parameter may include the aforementioned vps_num_ptls_minus1, ols_ptl_idx[i], vps_num_dpb_params, ols_dpb_params_idx[i], num_ols_hrd_params_minus1 and/or ols_hrd_idx[i].

Also, the decoding apparatus may derive a PTL parameter syntax structure for the target OLS based on the PTL index. For example, the decoding apparatus may derive a PTL parameter syntax structure for the target OLS indicated by the PTL index. The PTL parameter syntax structure may include a syntax element for the PTL parameter for the target OLS. For example, the PTL parameter syntax structure may be as shown in Table 17 above. For example, the syntax elements for the DPB parameter may include the aforementioned general_profile_idc, general_tier_flag, general_level_idc, num_sub_profiles, general_sub_profile_idc[i], sublayer_level_present_flag[i], ptl_alignment_zero_bits and/or sublayer_level_idc[i].

The decoding apparatus performs a DPB management process for a decoded picture buffer (DPB) based on the HRD parameter syntax structure for the target OLS (S930). The decoding apparatus may perform a DPB management process based on the HRD parameter syntax structure. For example, the decoding apparatus may perform a picture management process for the decoded picture of the DPB based on the HRD parameter syntax structure. For example, the decoding apparatus may add a decoded picture to the DPB, or may remove a decoded picture in the DPB. For example, the decoded picture in the DPB may be used as a reference picture of inter prediction for the current picture, or the decoded picture in the DPB may be used as an output picture. The decoded picture may mean a picture decoded before the current picture in decoding order in the target OLS.

Also, for example, the decoding apparatus may perform a DPB management process based on the HRD parameter syntax structure, the DPB parameter syntax structure, and/or the PTL parameter syntax structure. For example, the decoding apparatus may perform a picture management process for the decoded picture of the DPB based on the HRD parameter syntax structure, the DPB parameter syntax structure, and/or the PTL parameter syntax structure. For example, the decoding apparatus may add a decoded picture to the DPB, or may remove a decoded picture in the DPB. For example, the decoded picture in the DPB may be used as a reference picture of inter prediction for the current picture, or the decoded picture in the DPB may be used as an output picture. The decoded picture may mean a picture decoded before the current picture in decoding order in the target OLS.

The decoding apparatus decodes the current picture based on the DPB (S940). The decoding apparatus may decode the current picture based on the DPB on which the DPB management process is performed. For example, the decoding apparatus may derive a prediction sample by performing inter prediction on a block in the current picture based on the reference picture of the DPB, and may generate a reconstructed sample and/or a reconstructed picture for the current picture based on the prediction sample. Meanwhile, for example, the decoding apparatus may derive a residual sample of a block in the current picture based on residual information received through a bitstream, and may generate a reconstructed sample and/or a reconstructed picture through addition of the predicted sample and the residual sample.

As described above, an in-loop filtering procedure such as deblocking filtering, SAO, and/or ALF procedure may be applied to the reconstructed samples in order to improve subjective/objective picture quality as necessary thereafter.

FIG. 10 schematically illustrates a decoding apparatus for performing an image decoding method according to the present disclosure. The method disclosed in FIG. 9 may be performed by the decoding apparatus disclosed in FIG. 10. Specifically, for example, the entropy decoder of the decoding apparatus of FIG. 10 may perform S900 to S920 of FIG. 9, and the DPB of the decoding apparatus of FIG. 10 may perform S930 of FIG. 9, and the predictor and the residual processor of the decoding apparatus of FIG. 10 may perform S940 of FIG. 9.

According to the above-described disclosure, in signaling HRD-related information for OLSs including a plurality of layers, HRD-related information may be signaled by determining whether to transmit HRD for each OLS, and through this, it is possible to reduce the number of bits for signaling HRD-related information for OLSs including a plurality of layers, and overall coding efficiency can be improved.

In addition, according to the present disclosure, the HRD index for OLS may be coded with the descriptor u(v), and through this, coding efficiency for HRD index signaling may be improved.

In addition, according to the present disclosure, HRD-related syntax elements, DPB-related syntax elements, and/or PTL-related syntax elements for OLS may be coded as descriptors u(v) or ue(v), and through this, coding efficiency for signaling of HRD-related syntax elements, DPB-related syntax elements, and/or PTL-related syntax elements may be improved.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The embodiments described in this specification may be performed by being implemented on a processor, a microprocessor, a controller or a chip. For example, the functional units shown in each drawing may be performed by being implemented on a computer, a processor, a microprocessor, a controller or a chip. In this case, information for implementation (e.g., information on instructions) or algorithm may be stored in a digital storage medium.

In addition, the decoding apparatus and the encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus, a transportation user equipment (e.g., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present disclosure is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (e.g., transmission through the Internet). In addition, a bit stream generated by the encoding method may be stored in a computer-readable recording medium or may be transmitted over wired/wireless communication networks.

In addition, the embodiments of the present disclosure may be implemented with a computer program product according to program codes, and the program codes may be performed in a computer by the embodiments of the present disclosure. The program codes may be stored on a carrier which is readable by a computer.

FIG. 11 illustrates a structural diagram of a contents streaming system to which the present disclosure is applied.

The content streaming system to which the embodiment(s) of the present disclosure is applied may largely include an encoding server, a streaming server, a web server, a media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. Smartwatches, smart glasses, head mounted displays), digital TVs, desktops computer, digital signage, and the like. Each server in the content streaming system may be operated as a distributed server, in which case data received from each server may be distributed.

The claims described in the present disclosure may be combined in various ways. For example, the technical features of the method claims of the present disclosure may be combined to be implemented as an apparatus, and the technical features of the apparatus claims of the present disclosure may be combined to be implemented as a method. In addition, the technical features of the method claim of the present disclosure and the technical features of the apparatus claim may be combined to be implemented as an apparatus, and the technical features of the method claim of the present disclosure and the technical features of the apparatus claim may be combined to be implemented as a method.

The invention claimed is:

1. An image decoding method performed by a decoding apparatus, the method comprising:
    obtaining image information including Hypothetical Reference Decoder (HRD) related information for a target Output Layer Set (OLS), wherein the target OLS is one of OLSs including a plurality of layers;
    determining, based on the HRD related information, whether a HRD parameter syntax structure for the target OLS exists;
    deriving the HRD parameter syntax structure for the target OLS based on a result of the determination;
    performing a Decoded Picture Buffer (DPB) management process for a DPB based on the HRD parameter syntax structure for the target OLS; and
    decoding a current picture based on the DPB,
    wherein the HRD related information includes a VPS general HRD parameter existence flag indicating whether a Video Parameter Set (VPS) includes a general HRD parameter syntax structure,
    based on a value of the VPS general HRD parameter existence flag being equal to 1, OLS HRD existence flags of OLSs for the VPS indicating whether an HRD index of the OLSs for the VPS exist are obtained and a value of at least one of the OLS HRD existence flags of the OLSs for the VPS is 1,
    based on a value of an OLS HRD existence flag, which indicates whether an HRD index of the target OLS exists, being equal to 0, the HRD index is not obtained, and
    based on a value of the OLS HRD existence flag being equal to 1, the HRD index is obtained and the HRD parameter syntax structure for the target OLS is derived based on the HRD index.

2. The method of claim 1, wherein the HRD related information includes an HRD index for the target OLS,
    wherein the HRD parameter syntax structure for the target OLS is not obtained based on the HRD index having a value of 0, and
    wherein, in response to a value of the HRD index being not equal to 0, the HRD parameter syntax structure for the target OLS is derived based on a value resulting from adding 1 to the HRD index.

3. The method of claim 2, wherein the image information includes a VPS general HRD parameter existence flag for whether the VPS includes a general HRD parameter syntax structure, and
    wherein, in response to a value of the VPS general HRD parameter existence flag being equal to 1, a value of at least one of HRD indexes of the OLSs is not 0.

4. The method of claim 1, wherein the image information includes HRD parameter syntax structure number information on a number of HRD parameter syntax structures in the VPS,
    wherein the HRD index is coded based on a descriptor u (v), and
    wherein a number of bits v used to code the HRD index is derived based on the HRD parameter syntax structure number information.

5. The method of claim 4, wherein the HRD parameter syntax structure number information is coded based on a descriptor u (v), and
    wherein a number of bits v used to code the HRD parameter syntax structure number information is derived based on a number of OLSs for the VPS.

6. The method of claim 1, wherein the image information includes a DPB index for a DPB parameter syntax structure for the target OLS, and
    wherein the DPB index is coded based on a descriptor u (v).

7. The method of claim 6, wherein the image information includes DPB parameter syntax structure number information on a number of DPB parameter syntax structures in a Video Parameter Set (VPS), and
    wherein a number of bits v used to code the DPB index is derived based on the DPB parameter syntax structure number information.

8. The method of claim 7, wherein the DPB parameter syntax structure number information is coded based on a descriptor u (v), and wherein a number of bits v used to code the DPB parameter syntax structure number information is derived based on a number of OLSs for the VPS.

9. The method of claim 1, wherein the image information includes Profile Tier Level (PTL) parameter syntax structure number information on a number of PTL parameter syntax structures in a Video Parameter Set (VPS) and a PTL index for a PTL parameter syntax structure for the target OLS, wherein the PTL parameter syntax structure number information and the PTL index are coded based on a descriptor u (v), wherein a number of bits v used to code the PTL parameter syntax structure number information is derived based on a number of OLSs for the VPS, and wherein a number of bits v used to code the PTL index is derived based on the PTL parameter syntax structure number information.

10. The method of claim 1, wherein the image information includes Profile Tier Level (PTL) parameter syntax structure number information on a number of PTL parameter syntax structures in a Video Parameter Set (VPS) and a PTL index for a PTL parameter syntax structure for the target OLS, and wherein the PTL parameter syntax structure number information and the PTL index are coded based on a descriptor ue (v).

11. The method of claim 1, wherein the image information includes Profile Tier Level (PTL) parameter syntax structure number information on a number of PTL parameter syntax structures in a Video Parameter Set (VPS) and a PTL index for a PTL parameter syntax structure for the target OLS, wherein the PTL parameter syntax structure number information is coded based on a descriptor ue (v), wherein the PTL index is coded based on a descriptor u (v), and wherein a number of bits v used to code the PTL index is derived based on the PTL parameter syntax structure number information.

12. An image encoding method performed by an encoding apparatus, the method comprising:

determining whether a Hypothetical Reference Decoder (HRD) parameter syntax structure for a target OLS exists, wherein the target OLS is one of OLSs including a plurality of layers;

generating the HRD parameter syntax structure for the target OLS based on a result of the determination;

generating HRD related information for whether the HRD parameter syntax structure for the target OLS exists; and encoding image information including the HRD related information, wherein the HRD related information includes a VPS general HRD parameter existence flag indicating whether a Video Parameter Set (VPS) includes a general HRD parameter syntax structure, based on a value of the VPS general HRD parameter existence flag being equal to 1, OLS HRD existence flags of OLSs for the VPS indicating whether an HRD index of the OLSs for the VPS exist are encoded and a value of at least one of the OLS HRD existence flags of the OLSs for the VPS is 1, based on a value of an OLS HRD existence flag, which indicates whether an HRD index of the target OLS exists, being equal to 0, the HRD index is not encoded, and based on a value of the OLS HRD existence flag being equal to 1, the HRD index is encoded and the HRD parameter syntax structure for the target OLS is derived based on the HRD index.

13. A method for transmitting a bitstream including image information, the method comprising:

determining whether a Hypothetical Reference Decoder (HRD) parameter syntax structure for a target OLS exists, wherein the target OLS is one of OLSs including a plurality of layers;

generating the HRD parameter syntax structure for the target OLS based on a result of the determination;

generating HRD related information for whether the HRD parameter syntax structure for the target OLS exists; and encoding the image information including the HRD related information; and transmitting the bitstream including the image information, wherein the HRD related information includes a VPS general HRD parameter existence flag indicating whether a Video Parameter Set (VPS) includes a general HRD parameter syntax structure, based on a value of the VPS general HRD parameter existence flag being equal to 1, OLS HRD existence flags of OLSs for the VPS indicating whether an HRD index of the OLSs for the VPS exist are encoded and a value of at least one of the OLS HRD existence flags of the OLSs for the VPS is 1, based on a value of an OLS HRD existence flag, which indicates whether an HRD index of the target OLS exists, being equal to 0, the HRD index is not encoded, and based on a value of the OLS HRD existence flag being equal to 1, the HRD index is encoded and the HRD parameter syntax structure for the target OLS is derived based on the HRD index.

\* \* \* \* \*